US012623166B2

(12) United States Patent
Shope et al.

(10) Patent No.: US 12,623,166 B2
(45) Date of Patent: May 12, 2026

(54) FILTER ELEMENT WITH FLOW DIRECTING PERMEABILITY LAYERS

(71) Applicant: Cummins Filtration Inc., Nashville, TN (US)

(72) Inventors: Gregory D. Shope, Cookeville, TN (US); Shantanu Sanjay Ghatnekar, Pune (IN); Wassem Abdalla, Fishers, IN (US); Arun P. Janakiraman, Stoughton, WI (US); Kyle Ellison, Lebanon, TN (US); Barry Mark Verdegan, Stoughton, WI (US); Scott W. Schwartz, Cottage Grove, WI (US); Jeremiah Cupery, Madison, WI (US); Billy M. Bates, Cookeville, TN (US); Christopher E. Holm, Madison, WI (US)

(73) Assignee: Atmus Filtration Inc., Nashville, TN (US)

( * ) Notice: Subject to any disclaimer, the term of this patent is extended or adjusted under 35 U.S.C. 154(b) by 833 days.

(21) Appl. No.: 17/849,177

(22) Filed: Jun. 24, 2022

(65) Prior Publication Data

US 2022/0314144 A1 Oct. 6, 2022

Related U.S. Application Data

(63) Continuation of application No. PCT/US2020/065057, filed on Dec. 15, 2020.

(30) Foreign Application Priority Data

Dec. 26, 2019 (IN) .............................. 201941053893

(51) Int. Cl.
*B01D 29/21* (2006.01)
*B01D 46/52* (2006.01)
*F02M 37/34* (2019.01)

(52) U.S. Cl.
CPC ......... *B01D 29/216* (2013.01); *B01D 46/526* (2013.01); *B01D 2201/0415* (2013.01); *B01D 2201/291* (2013.01); *F02M 37/34* (2019.01)

(58) Field of Classification Search
CPC ........ B01D 29/21; B01D 46/32; B01D 32/34; B01D 46/10; B01D 29/216; B01D 46/526;
(Continued)

(56) References Cited

U.S. PATENT DOCUMENTS

| 1,729,135 | A | 9/1929 | Slauson |
| 2,599,604 | A | 6/1952 | Bauer et al. |

(Continued)

FOREIGN PATENT DOCUMENTS

| CN | 2126622 | 1/1993 |
| CN | 101060914 A | 10/2007 |

(Continued)

OTHER PUBLICATIONS

CN-106861311-A Translation (Year: 2017).*
(Continued)

*Primary Examiner* — Patrick Orme
(74) *Attorney, Agent, or Firm* — Foley & Lardner LLP

(57) ABSTRACT

A media pack includes a filtration sheet and a support sheet that is made from a different material than the filtration sheet. The filtration sheet is coupled to the support sheet. The support sheet is corrugated such that, together, the filtration sheet and the support sheet form a plurality of channels. The channels are alternately sealed on opposing ends of the media pack. In one embodiment, the permeability of the support sheet is less than a permeability of the filtration sheet.

20 Claims, 15 Drawing Sheets

(58) Field of Classification Search
CPC ...... B01D 2201/0415; B01D 2201/291; F02M
31/13; F02M 35/02; F02M 37/34
See application file for complete search history.

(56) References Cited

U.S. PATENT DOCUMENTS

| | | | |
|---|---|---|---|
| 2,980,208 A | 4/1961 | Neumann | |
| 3,020,977 A | 2/1962 | Huppke et al. | |
| 3,173,867 A | 3/1965 | Michaels | |
| 3,183,286 A | 5/1965 | Harms | |
| 3,280,985 A | 10/1966 | Czerwonka | |
| 3,293,833 A | 12/1966 | Barany | |
| 3,410,062 A | 11/1968 | Hart | |
| 3,521,429 A | 7/1970 | Leffler | |
| 3,722,696 A | 3/1973 | Dwyer et al. | |
| 3,853,529 A | 12/1974 | Farr et al. | |
| 3,921,432 A | 11/1975 | Rivers | |
| 4,144,043 A | 3/1979 | Johnston | |
| 4,177,050 A | 12/1979 | Culbert et al. | |
| 4,235,611 A | 11/1980 | Brownell | |
| 4,268,290 A | 5/1981 | Barrington | |
| 4,343,631 A * | 8/1982 | Ciliberti | B01D 46/71 |
| | | | 55/529 |
| 4,410,427 A | 10/1983 | Wydeven | |
| 4,498,915 A | 2/1985 | Witchell | |
| 4,528,008 A | 7/1985 | Takagi et al. | |
| 4,589,983 A | 5/1986 | Wydevan | |
| 4,839,037 A | 6/1989 | Bertelsen et al. | |
| 4,878,930 A | 11/1989 | Manniso et al. | |
| 4,925,561 A | 5/1990 | Ishii et al. | |
| 4,938,869 A | 7/1990 | Bayerlein et al. | |
| 5,114,582 A | 5/1992 | Sandstrom et al. | |
| 5,167,740 A | 12/1992 | Michaelis et al. | |
| 5,215,661 A | 6/1993 | Tanabe | |
| 5,316,677 A | 5/1994 | Harms, II | |
| 5,320,657 A | 6/1994 | Adams | |
| 5,397,632 A | 3/1995 | Murphy et al. | |
| 5,456,069 A | 10/1995 | Haerle | |
| 5,557,808 A | 9/1996 | Kawai | |
| 5,558,689 A | 9/1996 | Yanagihara et al. | |
| 5,679,251 A | 10/1997 | Swanson et al. | |
| 5,736,044 A | 4/1998 | Proulx et al. | |
| 5,772,883 A | 6/1998 | Rothman et al. | |
| 5,814,117 A | 9/1998 | Mochida | |
| 5,820,646 A | 10/1998 | Gillingham et al. | |
| 5,895,574 A | 4/1999 | Friedmann et al. | |
| 5,980,759 A | 11/1999 | Proulx et al. | |
| 6,000,685 A | 12/1999 | Groten et al. | |
| 6,068,771 A | 5/2000 | Mcdermott et al. | |
| 6,153,098 A | 11/2000 | Bayerlein et al. | |
| 6,165,242 A | 12/2000 | Choi | |
| 6,238,561 B1 | 5/2001 | Liu et al. | |
| 6,273,938 B1 | 8/2001 | Fanselow et al. | |
| 6,375,700 B1 | 4/2002 | Jaroszczyk et al. | |
| 6,391,076 B1 | 5/2002 | Jaroszczyk et al. | |
| 6,391,200 B2 | 5/2002 | Pulek et al. | |
| 6,444,006 B1 | 9/2002 | Haberkamp et al. | |
| 6,478,959 B1 | 11/2002 | Morgan et al. | |
| 6,544,310 B2 | 4/2003 | Badeau et al. | |
| 6,582,490 B2 | 6/2003 | Miller et al. | |
| 6,598,749 B2 | 7/2003 | Paul et al. | |
| 6,656,243 B2 | 12/2003 | Hodge | |
| 6,746,500 B1 | 6/2004 | Park et al. | |
| 6,887,343 B2 | 5/2005 | Schukar et al. | |
| 6,932,850 B1 | 8/2005 | Welch et al. | |
| 6,953,124 B2 | 10/2005 | Winter et al. | |
| 6,986,804 B2 | 1/2006 | Dominiak et al. | |
| 7,163,625 B1 | 1/2007 | Williamson et al. | |
| 7,311,747 B2 | 12/2007 | Adamek et al. | |
| 7,314,558 B1 | 1/2008 | Jaroszczyk et al. | |
| 7,323,105 B1 | 1/2008 | Janikowski et al. | |
| 7,323,106 B2 | 1/2008 | Jaroszczyk et al. | |
| 7,371,321 B1 | 5/2008 | Nesland, Sr. | |
| 7,425,227 B1 | 9/2008 | Hutchison et al. | |
| 7,481,863 B2 | 1/2009 | Oelpke et al. | |
| 7,488,365 B2 | 2/2009 | Golden et al. | |
| 7,497,886 B2 | 3/2009 | Walker | |
| 7,534,279 B2 | 5/2009 | Oh et al. | |
| 7,552,506 B2 | 6/2009 | Lee et al. | |
| 7,588,619 B2 | 9/2009 | Chilton et al. | |
| 7,625,418 B1 | 12/2009 | Choi | |
| 7,648,546 B2 | 1/2010 | Haberkamp et al. | |
| 7,736,408 B2 | 6/2010 | Bock et al. | |
| 7,779,507 B2 | 8/2010 | Jung et al. | |
| 7,797,790 B2 | 9/2010 | Park et al. | |
| 7,815,703 B2 | 10/2010 | Park | |
| 7,879,125 B2 | 2/2011 | Haberkamp et al. | |
| 7,883,572 B2 | 2/2011 | Neudeck | |
| 7,922,006 B2 | 4/2011 | Fall et al. | |
| 7,931,723 B2 | 4/2011 | Cuvelier | |
| 8,075,720 B2 | 12/2011 | Fall et al. | |
| 8,276,605 B2 | 10/2012 | Heathcote et al. | |
| 8,397,920 B2 | 3/2013 | Moy et al. | |
| 8,460,442 B2 | 6/2013 | Wagner et al. | |
| 8,491,689 B2 | 7/2013 | Duffy et al. | |
| 8,506,668 B2 | 8/2013 | Swanson et al. | |
| 8,545,658 B2 | 10/2013 | Spearin et al. | |
| 8,615,844 B2 | 12/2013 | Van Raalte et al. | |
| 8,673,148 B2 | 3/2014 | Straeffer et al. | |
| 8,728,188 B2 | 5/2014 | Kim et al. | |
| 8,852,310 B2 | 10/2014 | Holzmann et al. | |
| 8,888,885 B2 | 11/2014 | Barreteau et al. | |
| 9,038,235 B2 | 5/2015 | Van Der Kooi et al. | |
| 9,050,564 B2 | 6/2015 | Meyer-Blumenroth et al. | |
| 9,061,234 B2 | 6/2015 | Lundquist | |
| 9,180,396 B2 | 11/2015 | Maruyama | |
| 9,370,742 B2 | 6/2016 | Edwards et al. | |
| 9,457,307 B2 | 10/2016 | Kaufmann et al. | |
| 9,504,950 B2 | 11/2016 | Holzmann et al. | |
| 9,630,132 B2 | 4/2017 | Spengler et al. | |
| 9,808,753 B2 | 11/2017 | Lise et al. | |
| 9,827,527 B2 | 11/2017 | Merritt et al. | |
| 9,937,455 B2 | 4/2018 | Boehrs et al. | |
| 10,137,416 B2 | 11/2018 | Jons et al. | |
| 10,226,742 B2 | 3/2019 | Fischer-Fruhholz et al. | |
| 10,786,774 B2 | 9/2020 | Rocklitz et al. | |
| 11,439,943 B2 | 9/2022 | Page et al. | |
| 2002/0090324 A1 | 7/2002 | Badeau et al. | |
| 2003/0006186 A1 | 1/2003 | Pulek et al. | |
| 2003/0101701 A1 | 6/2003 | Henrichsen et al. | |
| 2003/0190269 A1 | 10/2003 | Liu et al. | |
| 2004/0226876 A1 | 11/2004 | Herron | |
| 2005/0072131 A1 | 4/2005 | Tate et al. | |
| 2006/0091084 A1 | 5/2006 | Merritt et al. | |
| 2006/0123754 A1 | 6/2006 | Oelpke et al. | |
| 2006/0151383 A1 | 7/2006 | Choi | |
| 2006/0272305 A1 | 12/2006 | Morgan | |
| 2007/0011996 A1 | 1/2007 | Tsuchiya et al. | |
| 2007/0056691 A1 | 3/2007 | Lin | |
| 2007/0102101 A1 | 5/2007 | Spearin et al. | |
| 2007/0130895 A1 | 6/2007 | Boeck et al. | |
| 2007/0186528 A1 | 8/2007 | Wydeven et al. | |
| 2007/0209343 A1 | 9/2007 | Cuvelier | |
| 2007/0262016 A1 | 11/2007 | Fall et al. | |
| 2007/0294856 A1 | 12/2007 | Park | |
| 2008/0000827 A1 | 1/2008 | Bruss | |
| 2008/0010957 A1 | 1/2008 | Yun et al. | |
| 2008/0011672 A1 | 1/2008 | Schwartz et al. | |
| 2008/0011673 A1 | 1/2008 | Janikowski et al. | |
| 2008/0104795 A1 | 5/2008 | Lang | |
| 2008/0120952 A1 | 5/2008 | Chilton et al. | |
| 2008/0274020 A1 | 11/2008 | Matsuoka | |
| 2008/0282890 A1 | 11/2008 | Rocklitz et al. | |
| 2009/0032469 A1 | 2/2009 | Panzani et al. | |
| 2009/0056753 A1 | 3/2009 | Heathcote et al. | |
| 2009/0102094 A1 * | 4/2009 | Golden | B01D 39/1623 |
| | | | 425/370 |
| 2009/0133212 A1 | 5/2009 | Morishita et al. | |
| 2009/0178232 A1 | 7/2009 | Hyun et al. | |
| 2009/0183338 A1 | 7/2009 | Van Raalte et al. | |
| 2009/0217820 A1 | 9/2009 | Neudeck | |
| 2009/0293224 A1 | 12/2009 | Hyun et al. | |
| 2010/0018173 A1 | 1/2010 | Park et al. | |
| 2010/0206173 A1 | 8/2010 | Oh | |

(56)  References Cited

U.S. PATENT DOCUMENTS

| | | |
|---|---|---|
| 2010/0269463 A1 | 10/2010 | Duffy et al. |
| 2010/0307134 A1 | 12/2010 | Sangiovani |
| 2010/0326396 A1* | 12/2010 | Patel .................... B01D 46/527 |
| | | 123/198 E |
| 2011/0152054 A1 | 6/2011 | Fall et al. |
| 2011/0186504 A1 | 8/2011 | Rocklitz |
| 2011/0197556 A1 | 8/2011 | Brown et al. |
| 2011/0252759 A1 | 10/2011 | Nicholas |
| 2011/0265436 A1 | 11/2011 | Platt |
| 2012/0047858 A1 | 3/2012 | Kim et al. |
| 2012/0055127 A1 | 3/2012 | Holzmann et al. |
| 2012/0110962 A1 | 5/2012 | Dewit et al. |
| 2012/0118814 A1 | 5/2012 | Moy et al. |
| 2012/0180664 A1 | 7/2012 | Lundquist |
| 2012/0211408 A1 | 8/2012 | Hopkins |
| 2012/0211411 A1 | 8/2012 | Hopkins |
| 2012/0233807 A1 | 9/2012 | Van Der Kooi et al. |
| 2012/0261333 A1 | 10/2012 | Moran et al. |
| 2013/0062276 A1 | 3/2013 | Barreteau et al. |
| 2013/0189081 A1 | 7/2013 | Bryant et al. |
| 2013/0306547 A1 | 11/2013 | Norris |
| 2014/0014597 A1 | 1/2014 | Knight et al. |
| 2014/0130467 A1 | 5/2014 | Herman et al. |
| 2014/0137524 A1 | 5/2014 | Jarrier |
| 2014/0165839 A1 | 6/2014 | Crabtree |
| 2014/0209528 A1 | 7/2014 | Eleftherakis et al. |
| 2014/0209529 A1 | 7/2014 | Eleftherakis et al. |
| 2014/0235419 A1 | 8/2014 | Lise et al. |
| 2014/0260132 A1 | 9/2014 | Maruyama |
| 2014/0260138 A1 | 9/2014 | Edwards et al. |
| 2014/0260139 A1 | 9/2014 | Merritt et al. |
| 2014/0331627 A1 | 11/2014 | Majer et al. |
| 2015/0013290 A1 | 1/2015 | Holzmann et al. |
| 2015/0047304 A1 | 2/2015 | Son |
| 2015/0059301 A1 | 3/2015 | Kaufmann et al. |
| 2015/0101486 A1 | 4/2015 | Castro et al. |
| 2015/0165348 A1 | 6/2015 | Lo |
| 2015/0165352 A1 | 6/2015 | Lang |
| 2015/0165362 A1 | 6/2015 | Canfield et al. |
| 2015/0211452 A1 | 7/2015 | Brown |
| 2015/0251111 A1 | 9/2015 | Savstrom et al. |
| 2015/0305583 A1 | 10/2015 | Jonsson |
| 2015/0315544 A1 | 11/2015 | Hamman |
| 2016/0016100 A1 | 1/2016 | Mouanda et al. |
| 2016/0067647 A1 | 3/2016 | Tate et al. |
| 2016/0193714 A1 | 7/2016 | Machama et al. |
| 2016/0214053 A1 | 7/2016 | Schwartz |
| 2016/0219954 A1 | 8/2016 | Nakamura |
| 2016/0265436 A1 | 9/2016 | Bryant et al. |
| 2016/0296773 A1 | 10/2016 | Lin |
| 2017/0028339 A1 | 2/2017 | Savstrom |
| 2017/0028341 A1 | 2/2017 | Rocklitz et al. |
| 2017/0056793 A1 | 3/2017 | Klein et al. |
| 2017/0056807 A1 | 3/2017 | Klein et al. |
| 2017/0065924 A1 | 3/2017 | Holzmann et al. |
| 2017/0157550 A1 | 6/2017 | Merritt et al. |
| 2017/0197165 A1 | 7/2017 | Schwartz et al. |
| 2017/0203247 A1 | 7/2017 | Lee |
| 2017/0216757 A1 | 8/2017 | Ouyang et al. |
| 2017/0234221 A9* | 8/2017 | Bryant et al. |
| 2017/0246571 A1* | 8/2017 | Adamek ............ B01D 46/0001 |
| 2017/0259216 A1 | 9/2017 | Madhavaram et al. |
| 2017/0266617 A1 | 9/2017 | Difrancesco et al. |
| 2018/0104651 A1 | 4/2018 | Guo et al. |
| 2018/0117518 A1 | 5/2018 | Johnson et al. |
| 2018/0161717 A1 | 6/2018 | Adamek et al. |
| 2019/0009204 A1 | 1/2019 | Schwartz |
| 2019/0046915 A1 | 2/2019 | Gieseke et al. |
| 2019/0329170 A1 | 10/2019 | Page et al. |
| 2020/0078721 A1 | 3/2020 | Ouyang et al. |
| 2020/0198681 A1 | 6/2020 | Jian |
| 2021/0046413 A1 | 2/2021 | Ouyang et al. |
| 2021/0129063 A1 | 5/2021 | Knapke et al. |
| 2021/0162332 A1 | 6/2021 | Loehl |

| | | |
|---|---|---|
| 2022/0118386 A1 | 4/2022 | Verdegan et al. |
| 2022/0355235 A1 | 11/2022 | Detra et al. |
| 2023/0018748 A1 | 1/2023 | Adams et al. |

FOREIGN PATENT DOCUMENTS

| | | | | |
|---|---|---|---|---|
| CN | 101534923 A | 9/2009 | | |
| CN | 101626820 A | 1/2010 | | |
| CN | 102159296 A | 8/2011 | | |
| CN | 102781546 A | 11/2012 | | |
| CN | 103796726 A | 5/2014 | | |
| CN | 106861311 A | * 6/2017 | ......... | B01D 46/0005 |
| CN | 107073376 | 8/2017 | | |
| CN | 108601996 A | 9/2018 | | |
| CN | 109641169 | 4/2019 | | |
| CN | 113856367 A | 12/2021 | | |
| DE | 83 23 892 U1 | 12/1985 | | |
| DE | 10309661 A1 | 9/2004 | | |
| DE | 10 2015 007 659 A | 12/2015 | | |
| EP | 0 671 15 A1 | 12/1982 | | |
| EP | 0 842 689 | 5/1998 | | |
| EP | 1 118 369 | 7/2001 | | |
| EP | 1 254 689 A1 | 11/2002 | | |
| ES | 2868898 T3 | 3/2021 | | |
| GB | 753 510 | 7/1956 | | |
| GB | 2 131 717 | 6/1984 | | |
| IT | MI20111046.7 | 12/2012 | | |
| JP | 2009-057859 A | 3/2009 | | |
| JP | 5333550 B2 | 11/2013 | | |
| KR | 20040056938 A | 7/2004 | | |
| KR | 20210133669 A | 8/2021 | | |
| WO | WO-2010/011628 A2 | 1/2010 | | |
| WO | WO-2010/014579 A1 | 2/2010 | | |
| WO | WO-2012/067729 A1 | 5/2012 | | |
| WO | WO-2013/133865 A1 | 9/2013 | | |
| WO | WO-2016/014549 A1 | 1/2016 | | |
| WO | WO-2016/019307 A1 | 2/2016 | | |
| WO | WO-2016/040332 A1 | 3/2016 | | |
| WO | WO-2016/077377 A1 | 5/2016 | | |
| WO | WO-2017/031168 A1 | 2/2017 | | |
| WO | WO-2017/066169 A1 | 4/2017 | | |
| WO | WO-2018/191147 A1 | 10/2018 | | |
| WO | WO-2018/191865 A1 | 10/2018 | | |
| WO | WO-2019/032773 | 2/2019 | | |
| WO | WO-2019/040324 | 2/2019 | | |
| WO | WO-2019/060904 | 3/2019 | | |
| WO | WO-2019/199676 A1 | 10/2019 | | |
| WO | WO-2020/174251 | 9/2020 | | |
| WO | WO-2020/198681 | 10/2020 | | |
| WO | WO-2020/263275 | 12/2020 | | |
| WO | WO-2021/133589 A1 | 7/2021 | | |

OTHER PUBLICATIONS

Non-Final Office Action issued for U.S. Appl. No. 17/044,529 issued Sep. 21, 2023, 61 pages.

Non-Final Office Action issued for U.S. Appl. No. 17/862,050 issued Aug. 2, 2023, 37 pages.

First Office Action issued for Chinese Patent Application No. 2020890089705.9 issued Apr. 27, 2023, 7 pages.

Office Action issued for European Patent Application No. 19 800 228.9 issued Feb. 10, 2023, 5 pages.

EP Extended Search Report on EP19800228.9 Dtd Dec. 2, 2021 (11 pages).

First Examination Report for Indian Patent App. No. 201947020330 dated Nov. 27, 2020, 6 pages.

First Examination Report for Indian Patent App. No. 809/KOLNP/2012 dated Oct. 8, 2018, 6 pages.

First Examination Report issued for Indian Patent Application No. 202047047851, issued Mar. 10, 2021, 6 pages.

First Office Action for Chinese Patent App. No. 201410767340.7 dated Nov. 26, 2015, 14 pages (with translation).

First Office Action issued for Chinese Patent Application No. 2017800765908, issued Jan. 20, 2021, 13 pages.

Office Action issued for Chinese Patent Application No. CN 201780064747.5 Dtd Dec. 1, 2020.

(56)　　　　　References Cited

OTHER PUBLICATIONS

Office Action issued for Chinese Patent Application No. CN201980029872.1 Dtd Oct. 11, 2021.

German Office Action issued for German Patent Application No. DE 112011103785.6 Dtd Nov. 10, 2021.

Foreign Action other than Search Report on EP 17862733.7 Dtd Nov. 18, 2021.

Foreign Action other than Search Report on EP 17862733.7 Dtd Jun. 24, 2021.

Partial Supplementary European Search Report issued for European Patent Application No. EP 17862733.7 Dtd Jul. 21, 2020.

International Search Report & Written Opinion for PCT/US2011/054924 dated Jan. 23, 2012, 9 pages.

International Search Report and Written Opinion for PCT/US2017/056744, dated Feb. 13, 2018, 11 pages.

International Search Report and Written Opinion for PCT/US2017/065726, dated Feb. 16, 2018, 11 pages.

International Search Report and Written Opinion for PCT/US2019/031132, dated Jul. 17, 2019, 12 pages.

International Search Report and Written Opinion for PCT/US2019/065259 dated Feb. 11, 2020, 15 pages.

International Search Report and Written Opinion issued for PCT Application No. PCT/US2020/065057 issued Mar. 19, 2021, 15 pages.

International Search Report and Written Opinion on PCT PCT/US2022/030048 Dtd Oct. 6, 2022 (11 pages).

Matteson, Michael J. and Orr, Clyde, editors, "Filtration Principles and Practices, Second Edition, Revised and Expanded," Marcel Dekker, Inc. New York and Basel, 1987, p. 548.

Office Action issued for U.S. Appl. No. 16/343,076 Dtd Dec. 20, 2021.

Office Action issued for German Patent Application No. DE 112011103785.6 issued Mar. 5, 2021, 19 pages.

Partial Supplementary European Search Report for European Patent App. No. 17862733.7 dated Apr. 17, 2020, 11 pages.

Second Office Action issued for Chinese Patent Application No. CN 201780064747.5, issued Jul. 23, 2021, 10 pages.

Office Action issued for U.S. Appl. No. 16/468,460 Dtd Jul. 9, 2021.

Chinese Office Action issued for Chinese Patent Application No. 201980103361.X issued Jan. 30, 2024, 11 pages.

Partial Supplementary European Search Report issued for European Patent Application No. 22811880.8 issued Mar. 6, 2025, 14 pages.

Non-Final Office Action issued for U.S. Appl. No. 17/783,472 issued Jul. 16, 2025, 54 pages.

* cited by examiner

| Property/Characteristic | Units | Filtration Sheet (FS) | | | Support Sheet (SS) | | |
|---|---|---|---|---|---|---|---|
| Requirement | | Minimum | Preferred | Ideal | Minimum | Preferred | Ideal |
| Permeability (Frazier) | cfm | ≤ 100 | ≤ 20 | ≤ 10 | < FS | < 10% of FS | < 1% of FS |
| Mean Flow Pore Size (P50) | μm | ≤ 30 | ≤ 10 | ≤ 5 | ≤ 0.3 | < FS | |
| Thickness | mm | ≤ 1 | ≤ 0.3 | ≤ 0.1 | ≤ 0.3 | ≤ 0.1 | ≤ 0.02 |
| Surface Area | - | < SS | | | > FS | | |
| | | Media Contains a Sublayer such that | | | | | |
| Geometric Mean Fiber Diameter | μm | ≤ 1 | ≤ 1 | ≤ 1 | | | |
| Nanofiber | % by number | ≥ 0% | > 50% | > 80% | | | |

| Test | Filter Type | Face Velocity | Normalized Capacity |
|---|---|---|---|
| A | Channel Flow Filter Element | 1 | 129.5 |
| B | Pleated Filter Element | 1.72 | 87.7 |
| C | Channel Flow Filter Element | 2.38 | 81.1 |
| D | Pleated Filter Element | 2.38 | 67.2 |

FIG. 14

| Comparison | Percent Change |
|---|---|
| A vs B | 147.7% |
| A vs C | 159.7% |
| B vs D | 130.5% |
| C vs D | 120.7% |

FIG. 15

FILTER ELEMENT WITH FLOW DIRECTING PERMEABILITY LAYERS

CROSS-REFERENCE TO RELATED PATENT APPLICATIONS

The present application claims the benefit of and priority to Indian Patent Application No. 201941053893, entitled "Filter Element with Flow Directing Permeability Layers" and filed Dec. 26, 2019, the entire disclosure of which is hereby incorporated by reference herein.

TECHNICAL FIELD

The present disclosure relates generally to filters for use with internal combustion engine systems.

BACKGROUND

Internal combustion engines generally use various fluids during operation. For example, fuel (e.g., diesel, gasoline, natural gas, etc.) is used to run the engine. Air may be mixed with the fuel to produce an air-fuel mixture, which is then used by the engine to run under stoichiometric or lean conditions. Furthermore, one or more lubricants may be provided to the engine to lubricate various parts of the engine (e.g., piston cylinder, crank shaft, bearings, gears, valves, cams, etc.). These fluids may become contaminated with particulate matter (e.g., carbon, dust, metal particles, etc.) which may damage the various parts of the engine if not removed from the fluid. To remove such particulate matter or other contaminants, the fluid is generally passed through a filter assembly (e.g., a fuel filter, a lubricant filter, an air filter, a water filter assembly, etc.) structured to remove the particulate matter from the fluid prior to delivering the fluid. The holding capacity of particular matter within a filter assembly, and thus the overall lifetime of a filter element within the filter assembly, is limited by the size of the filter assembly.

SUMMARY

In one set of embodiments, a filter element includes a media pack. The media pack includes a filtration sheet and a corrugated support sheet that is coupled to the filtration sheet. The corrugated support sheet is made from a different material than the filtration sheet. The corrugated support sheet and the filtration sheet form a plurality of channels that are alternately sealed on opposing ends of the media pack.

In another set of embodiments, a filter element includes a center tube, a media pack, and a first endcap. The media pack is disposed around the center tube and includes a filtration sheet and a corrugated sheet that is coupled to the filtration sheet. The corrugated support sheet is made from a different material than the filtration sheet. The corrugated support sheet and the filtration sheet form a plurality of channels that are alternately sealed on opposing ends of the media pack. The first endcap is coupled to a first axial end of the media pack.

In yet another set of embodiments, a filter element includes a center tube, a media pack, and an endcap. The media pack is disposed around the center tube and includes a filtration sheet and a corrugated support sheet that is coupled to the filtration sheet. The corrugated support sheet and the filtration sheet form a plurality of channels that are alternatively sealed on opposing ends of the media pack. The media pack includes a first filtration stage and a second filtration stage having a different permeability that the first filtration stage for a fluid to be filtered.

In some embodiments, a stiffness of the support sheet is greater than a stiffness of the filtration sheet. The permeability of the support sheet (for a fluid to be filtered) is less than or equal to a permeability of the filtration sheet. In some embodiments, the filtration sheet does not include corrugations. In some implementations, the support sheet is made from one of aluminum or a polymeric material.

In some embodiments, the media pack includes a first filtration stage and a second filtration stage having a different permeability (for a fluid to be filtered) than the first filtration stage. In particular, the filtration sheet for the first filtration stage may have a lower permeability (for a fluid to be filtered) than a second filtration sheet for the second filtration stage. In some implementations, the first filtration stage may be at least partially separated from the second filtration stage by an adhesive barrier.

In another set of embodiments, a filter assembly includes a filter housing and a filter element coupled to the filter housing. The filter element includes a media pack disposed within the filter housing. The media pack includes a filtration sheet and a support sheet that is made from a different material than the filtration sheet. The filtration sheet is coupled to the support sheet. The support sheet is corrugated such that the filtration sheet and the support sheet together form a plurality of channels. The channels are alternately sealed on opposing ends of the media pack.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 14 is a table of test results for different types of filter elements.

FIG. 15 is a table comparing the test results from FIG. 14.

Figure 1:
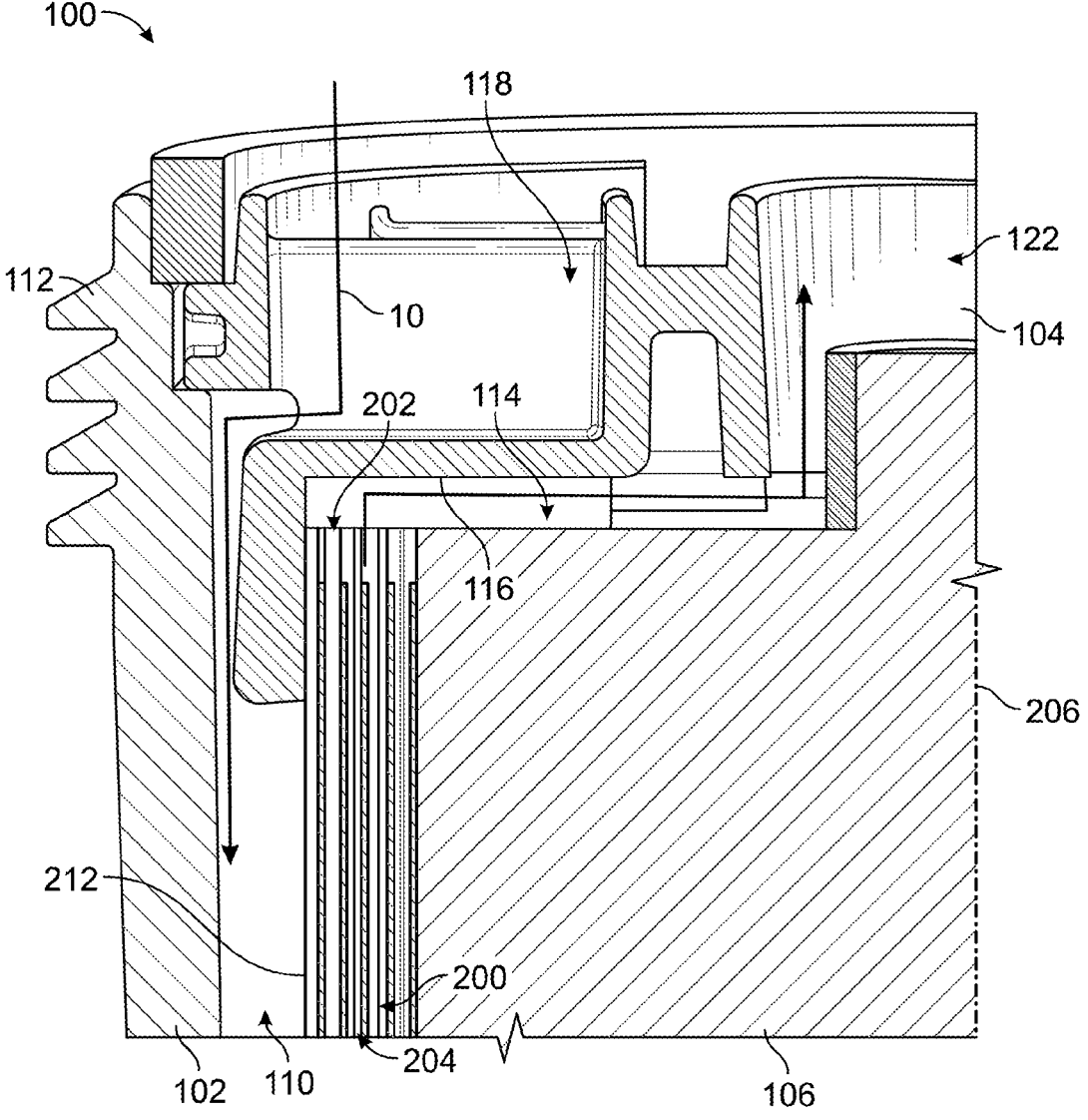
FIG. 1 is a side cross-sectional view of a filter assembly portion, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to filter assemblies including axial flow (e.g., channel flow, wall flow, etc.) filter elements. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Filter assemblies are used in internal combustion engine systems to remove particulate contamination from a working fluid (e.g., air, lube oil, fuel, etc.). Among other factors, filter performance (e.g., pressure drop, contaminant removal efficiency, service life, etc.) is a function of the filter media properties of the filter assembly, the arrangement of filter media, and the operating parameters of the fluid system. In particular, filter performance is a function the total filter media surface area available for filtration. In general, increasing the media surface area for a given flow rate of fluid improves filter performance (e.g., reduces face velocity and pressure drop across the media, and increases the particulate holding capacity of the filter assembly). Filtration assemblies with large media surface areas are especially desirable in oil filtration for high pressure hydraulic systems and fuel filtration for engine common rail systems, where high particle removal efficiencies at small particle sizes are required. However, the total amount of media that can be accommodated within a filter assembly is often limited by application specific constraints.

One way of increasing the media surface area within a filter assembly is to modify the geometry of the media. For example, the media may be corrugated (e.g., pleated, folded, etc.) to provide a greater media surface area across a fixed volume. The flow may be oriented normal to the filter media surface (in a "normal flow filter element"), or substantially parallel to the media surface, along channels formed between the corrugations. Normal flow filter elements are commonly used in diesel fuel, hydraulic, lube and many air intake applications. In such applications, it is important that the corrugations in the media retain their shape under the applied pressure drop from the working fluid. For this reason, normal flow filter elements often include screens and/or stronger, thicker media.

Parallel, channel, or axial flow filter elements are found primarily in air, diesel emission control, and membrane filtration applications. In an axial flow filter element, channels are created by stacking or otherwise layering sheets of corrugated media and then alternately sealing the upstream and downstream ends of each channel. In some embodiments, alternating layers of corrugated and flat sheets of filtration media are used. In these instances, the corrugated sheet performs the primary filtration function and has a higher permeability than the flat sheet (for the fluid to be filtered) to minimize pressure drop and maximize the media surface area available for particulate/contaminant capture.

The channels of the filter element of filter media may be alternately sealed at the upstream and downstream ends using an adhesive product such as hotmelt or glue. Fluid entering each channel passes along the length of the channel, through one layer of filter media, and out through the unsealed end of an adjacent channel (having an unsealed downstream end). To maximize the service life (e.g., lifetime) of the filter element, and to minimize pressure drop across the filter media, each layer of media provides a filtration function. Among other benefits, the layering of filter media in an axial flow filter element provides a significant increase in the overall media surface area as compared to a normal flow filter element for the same package space (e.g., volume). However, axial flow filter elements do not hold up well in high pressure liquid filtration applications, as the pressure drop encountered in these applications is sufficient to collapse the channels formed by the filter media. The situation is worsened when high contaminant removal efficiencies are required, as the pressure drop across filter media tends to increase with increased removal efficiency.

In contrast to the foregoing filter element designs, implementations described herein relate to an axial flow filter element including alternatively-sealed channels formed by layers of filtration sheets separated by corrugated (e.g., pleated, folded, etc.) support sheets that are made from a different material than the filtration sheets. More specifically, implementations described herein relate to axial flow filter elements having a corrugated support sheet that is more restrictive (e.g., less permeable) than the filtration sheets. The corrugated support sheet provides structural support to the filter element and directs flow through the filtration sheet. In some embodiments, the support sheet is impermeable (or substantially impermeable) to the fluid to be filtered in the particular application (e.g., impermeable to fuel in a fuel filtration application, impermeable to oil in an oil filtration application, etc.). For example, the support sheet may be made from metal, plastic, polymeric material, or a ceramic formed into a desired shape. In other embodiments, the support sheet includes a restrictive, but not impermeable fibrous filter media to allow a small fraction of the fluid to pass through the support sheet. In some embodiments, the mechanical stiffness of the support sheet may be greater than the filtration sheet. Notably, the surface area of the support sheet, due to the corrugations, is greater than the surface area of the flat sheet, which increases the overall structural strength of the filter element under an applied fluid pressure. Moreover, the structural support provided by the support sheet allows thinner material to be used for the filtration sheet, which allows greater filter media surface area for a given package size.

In some implementations, the filter element includes multiple filtration stages, each having a different permeability for the fluid to be filtered. For example, the filter element may include a first filtration stage having a first permeability and a second filtration stage having a second permeability that is greater than the first filtration stage. Among other benefits, incorporating multiple filtration stages into a single filter element improves coalescence and fluid separation performance in a liquid filtration assembly. In embodiments where multilayered media is used for the filtration sheet (e.g., multiple layers of media including a backing sheet and a melt-blown layer, etc.), the second filtration stage may use at least some of the same media formulation as the first stage. For example, the second stage may include only the backing sheet of the first stage filtration sheet. In this way, the axial flow filter element, including the first filtration stage and the second filtration stage, may be formed together as a single unitary body during the manufacturing process (e.g., without an intermediate bonding operation to connect the second filtration stage to the first filtration stage, etc.).

As used herein, the term "filter element" refers to a cartridge within the filtration assembly that is disposed substantially within a filter housing. The filter element includes a media pack and supporting elements (e.g., frame, endcaps, seals, etc.) that mechanically connect the media pack to the filter housing. The term "media pack" refers to a portion of the filter element that removes particulate contaminants from a fluid passing through the filter element. Additionally, the media pack directs the flow of fluid through the filtration sheet via the support layer. The term "media form" refers to a joined layering of materials (e.g., sheets of media or structural materials) that may be folded, stacked, or otherwise altered into a desired shape to form the media pack. Finally, the term "filter media" may be used to describe, generally, one or more of the media pack and/or media form throughout the description.

I. Example Filter Elements

FIG. 1 is a perspective view of a filter element 100, according to an example embodiment. In some embodiments, the filter element 100 may be a replaceable lube oil filter cartridge for an internal combustion engine system. In other embodiments, the filter element 100 may be a replaceable cartridge for a fuel filter or another liquid filtration system. As shown in FIG. 1, the filter element 100 includes a housing 102, an endcap 104, a center tube 106, and a media pack 200. The housing 102 forms an interior cavity 110 (e.g., hollow portion, etc.) into which the endcap 104, the center tube 106, and the media pack 200 are received. The housing 102 includes a threaded interface 112 that may be used to mechanically couple the filter element 100 to a filter assembly (not shown).

The endcap 104 supports the center tube 106 and the media pack 200 in position within the housing 102. The endcap 104 is sealingly engaged to the housing 102 along an outer perimeter of the endcap 104. The endcap 104 may include an O-ring or another sealing element to prevent fluid from bypassing the media pack 200 along the interface between the endcap 104 and the housing 102. As shown in FIG. 1, the endcap 104 is press-fit into a recessed area or shelf that is disposed in an upper end of the housing 102. A downstream end 202 (e.g., an upper end as shown in FIG. 1) of the media pack 200 is mechanically connected to the endcap 104. As shown in FIG. 1, the downstream end 202 of the media pack 200 is disposed at least partially within a recessed area along a lower face of the endcap 104. The downstream end 202 extends part-way into the recessed area such that a gap 114 is formed between a lower interior surface 116 of the endcap 104 and the downstream end 202. The filter element 100 includes a ring of adhesive (e.g., epoxy, glue, etc.) that extends around an outer perimeter of the media pack 200 and prevents fluid from bypassing the media pack 200 through the interface between the media pack 200 and the endcap 104.

The media pack 200 is coupled to and supported by the center tube 106, which extends along a central axis of the media pack 200. Specifically, the media pack 200 is spiral wound around the center tube 106 such that the media pack 200 circumferentially surrounds the center tube 106. The media pack 200 is sealingly engaged with the center tube 106 to prevent fluid bypass through the cylindrical volume formed by the inner layers of the media pack 200.

FIG. 1 shows the flow path of fluid 10 through the filter element 100. In the embodiment shown, a lower end of the media pack 200 is the upstream end 204, and an upper end of the media pack 200 opposite the lower end is the downstream end 202. Dirty fluid 10 enters the filter element 100 through a plurality of openings 118 disposed along an outer circumferential region of the endcap 104. Next, the fluid 10 passes vertically downwardly (as shown in FIG. 1) through an annular space formed between an outer perimeter of the media pack 200 and an inner wall of the housing 102. The fluid is directed from the upstream end of the media pack 200 along a plurality of channels formed by the media pack 200, in an axial direction parallel to a central axis 206 of the media pack 200 (e.g., a central axis of the center tube 106, vertically as shown in FIG. 1, etc.). Contaminants (e.g., particulate, etc.) are removed from the fluid 10 passing through the filter media within the media pack 200. Clean filtered fluid 10 is discharged from the downstream end 202 of the media pack 200, through the gap 114, and is ejected (e.g., discharged) through a central opening 122 defined by the endcap 104.

Figure 2:
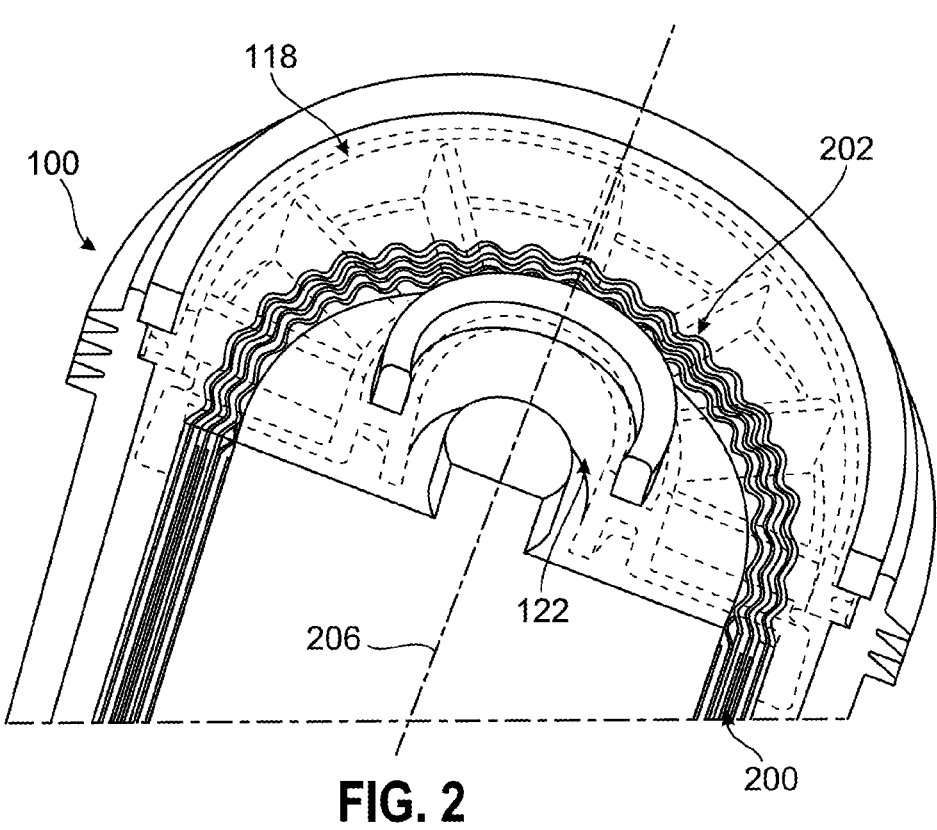
FIG. 2 is a perspective view of the filter assembly portion of FIG. 1.
Figure 3:
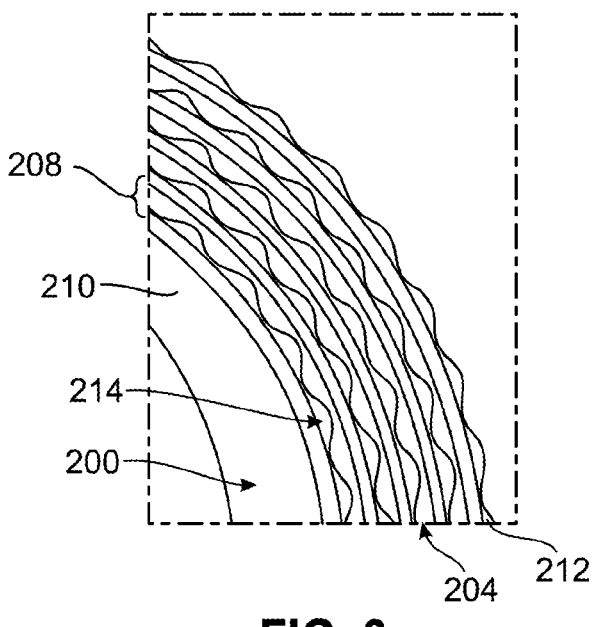
FIG. 3 is a perspective view of a portion of a media pack of the filter assembly portion from an upstream end of the media pack.

FIG. 2 shows a perspective view of the downstream end 202 of the media pack 200. FIG. 3 shows a perspective view of the upstream end 204 of the media pack 200 opposite the downstream end 202. In some embodiments, the media pack 200 is configured to receive fluid flows in the opposite direction through the filter element 100 from that shown in FIG. 1. In other words, the filter element 100 may receive dirty fluid through the central opening 122 and eject clean fluid through the plurality of circumferential openings 118.

As shown in FIGS. 2-3, the media pack 200 may be formed from a coiled media form 208 that is spiral wound around the center tube 106. As shown in FIG. 3, the media form 208 includes a plurality of media layers that are stacked on top of one another in a radial direction (e.g., laterally, normal to the central axis 206 of the media pack 200). In particular, the media form 208 includes a filtration sheet 210 and a support sheet 212 stacked on top of one another in alternating fashion. As shown in FIG. 3, the support sheet 212 is corrugated (e.g., pleated, folded, etc.), while the filtration sheet 210 is a flat sheet that extends between the corrugations. Together, the filtration sheet 210 and the support sheet 212 form a plurality of axial flow channels 214 that are arranged in parallel orientation relative to the central axis 206. The channels 214 are alternately sealed at each end of the media pack 200 such that an open channel 214 at an upstream end 204 of the media pack 200 is closed at the downstream end 202 of the media pack 200.

Figure 4:
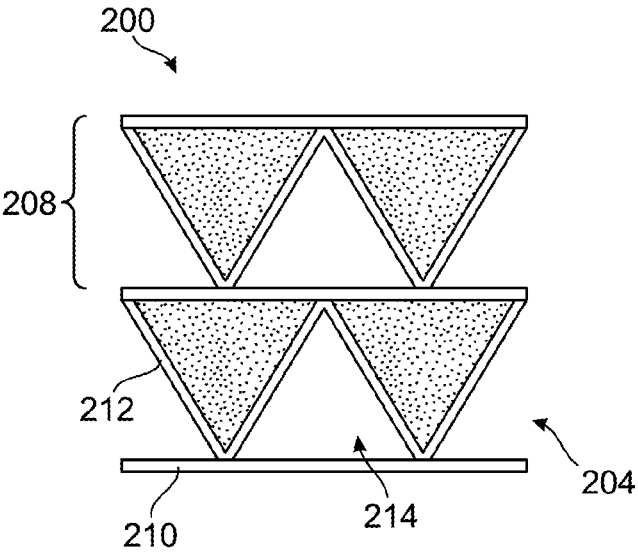
FIG. 4 is a cross-sectional view of a portion of the media pack of FIG. 3 from the upstream end of the media pack.
Figure 5:
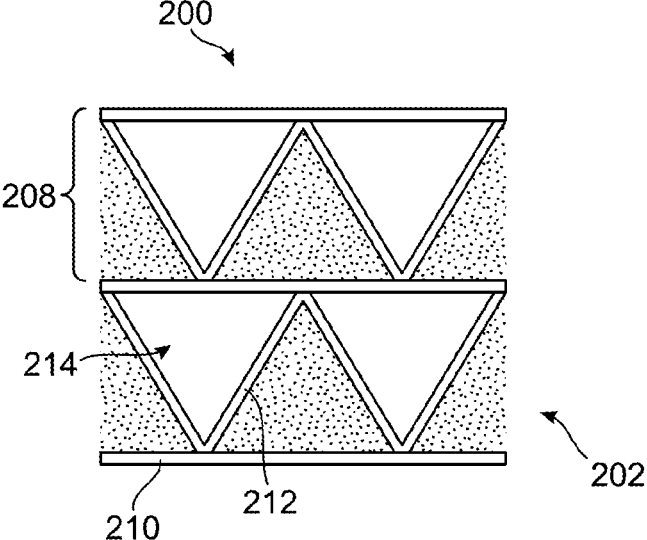
FIG. 5 is a cross-sectional view of a portion of the media pack of FIG. 3 from a downstream end of the media pack opposite the upstream end.

FIGS. 4-5 show cross-sectional views of a portion of the media pack 200 from the upstream end 204 and the downstream end 202, respectively. The channels 214 are formed by the intersection between the corrugated support sheet 212 and the filtration sheet 210. As shown in FIGS. 4-5, channels 214 defined by an upper surface of each corrugated support sheet 212 are sealed at the upstream end 204 and open at the downstream end 202. In contrast, channels 214 defined by a lower surface of each corrugated support sheet 212 are open at the upstream end 204 and closed at the downstream end. The channels 214 may be closed at either end using hotmelt, glue, or another suitable adhesive product during the manufacturing process as will be further described. In other embodiments, the ends of the channels 214 can be closed off without glue or adhesive. For example, the ends of the channels 214 can be closed off by folding a preformed support sheet 212 over the end of the filtration sheet 210. In embodiments where the support sheet 212 is made from a polymeric material, the ends of the channels 214 can be closed off using an ultrasonic welding operation to sealingly engage the support sheet 212 with the filtration sheet 210 at the ends of the channels 214.

In operation, dirty fluid entering the media pack 200 through the upstream end 204 passes axially (into the page as shown in FIG. 4) through the channels 214 (e.g., the channels 214 defined by a lower surface of the support sheet 212), in a direction that is substantially parallel to the walls of the channels 214. The fluid passes through the walls of the filtration sheet 210, from a dirty side of the filtration sheet 210 to an adjacent channel 214 on a clean side of the filtration sheet 210 (e.g., the channels 214 defined by an upper surface of the support sheet 212), where the fluid is discharged from the media pack 200.

As shown in FIGS. 4-5, the corrugated support sheet 212 is pleated or otherwise formed into a V-shape defining channels 214 having a triangular cross-sectional shape. In other embodiments, the support sheet 212 may be formed into another suitable shape. For example, the support sheet 212 may be pleated, folded, or otherwise formed into a continuous sine wave shape, a sawtooth shape, or another suitable shape. Similarly, the cross-sectional shape of the channels 214 may differ in various embodiments. For example, the support sheet 212 and the filtration sheet 210 may define channels having an elliptical cross-sectional shape, a rectangular cross-sectional shape, or another suitable shape. Depending on the cross-sectional geometry of the channels, the media pack 200 may include elliptical channels, fluted channels, tetrahedral shaped channels, or another suitable shape. In some embodiments, the shape of the corrugations varies in the flow direction along the support sheet 212 such that the channels having a non-uniform geometry along a flow direction through the media pack 200. For example, the support sheet 212 may be bent or otherwise formed such that size of the channels varies along the flow direction through the media pack 200.

Figures 6A, 6B:
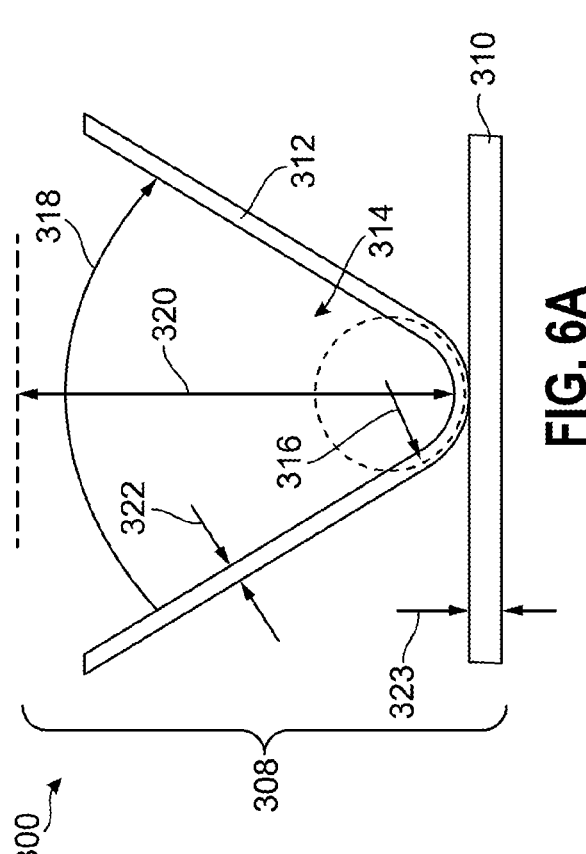
FIG. 6A is a cross-sectional view of a portion of a media pack through a single corrugation of a support sheet, according to another embodiment.
FIG. 6B is a table summarizing material properties for a media pack, according to an embodiment.

FIG. 6A is a side cross-sectional view of a media form 308 of another filter element, according to example embodiment. As shown in FIG. 6A, the media form 308 includes a corrugated support sheet 312 that is formed into a V-shape with a bend radius 316 at the intersection between adjacent corrugations. FIG. 6A also shows the various parameters of the corrugation geometry that can be varied to optimize the performance of the media pack 300. For example, the corrugation geometry of the support sheet 212 is characterized, in part, by a bend angle 318 between adjacent corrugations, a height 320 between a lower surface and an upper surface of the channel 314, and a thickness 322 of the support sheet 312. The bend angle 318 and the bend radius 316, as well as the thickness 322 of the support sheet 312 are selected to maintain separation of adjacent filtration sheets 310 (e.g., to prevent deformation of the filtration sheets 310 into the channels 314, etc.), and also to enable processing of the support sheet 312 into the media pack 300. In the embodiment of FIG. 6A, the height 320 of each of the channels 314 varies within a range between approximately 0.25 mm and 10 mm, and more particularly within a range between approximately 1-2 mm. In other embodiments, the range of heights 320 may be different.

The media forms 208, 308 shown in FIGS. 4 and 6A, respectively, include a filtration sheet and a support sheet that is made from a different material than the filtration sheet. More specifically, the support sheet is made from a material that is more restrictive (e.g., less permeable) than the filtration sheet. In some embodiments, the support sheet is made from an entirely different material than the filtration sheet. In other embodiments, the support sheet is at least partially made from the same material as the support sheet but also includes another material (e.g., a stiffening coating, etc.). Referring to FIG. 6A, the filtration sheet 310 serves as the primary (or only) filtration element. In other words, the support sheet 312 is impermeable (or substantially impermeable) to the fluid to be filtered (e.g., impermeable to fuel in a fuel filtration application, impermeable to oil in an oil filtration application, etc.). In other embodiments, the support sheet 312 includes a restrictive, but not impermeable fibrous filter media to allow a small fraction of the fluid to pass through the support sheet 312. The filtration sheet 310 includes a porous material having a mean pore size that is configured to filter particulate matter from a fluid flowing therethrough so as to produce a filtered fluid. The filtration sheet 310 may include any suitable fibrous filter media, membrane filter media, and/or composite filter media with particle removal and restriction characteristics appropriate to the application. In some embodiments, the filtration sheet 310 includes a nanofiber material (e.g., a material including fibers with a fiber diameter less than or equal to approximately 1 μm). The filtration sheet 310 may additionally include one or more reinforcement layers (e.g., sheets, etc.) such as a scrim layer to support the nanofiber material. For example, the filtration sheet 310 may include two scrim layers with nanofiber sandwiched or otherwise disposed in between the scrim layers. In some embodiments, the filtration sheet 310 includes fibers or nanofiber of a polymer such as polyamide, nylon, polyester, fluorocarbon, glass, ceramic, metal, and/or other materials. Various examples of nanofiber materials suitable for use in liquid filtration are provided in U.S. Pat. No. 8,678,202, filed May 2, 2013, U.S. Patent Publication No. 2018/0243675, filed Apr. 27, 2018, U.S. Pat. No. 10,391,434, filed Jul. 3, 2018, U.S. Patent Publication No. 2019/0160405, filed Oct. 8, 2018, and U.S. Pat. No.

9,199,185, filed May 14, 2010, all of which are hereby incorporated by reference herein.

The support sheet 312 provides structural support to the media pack 300 (e.g., the filtration sheet 310), directs fluid along the channels 314, and prevents deformation and/or collapse of the channels 314 under an applied fluid pressure drop across the media pack 300. Notably, the structure provided by support sheet 312 in combination with the substantially planar and/or flat filtration sheet 310 allows for the use of nanofiber material, which is normally prohibited due to the susceptibility of nanofiber to deformation under an applied fluid pressure. The mechanical strength provided by the support sheet 312 allows for a reduction in the material thickness 323 of the filter media (e.g., filtration sheet 310) as compared to other axial flow filter element design configurations. Among other benefits, the use of a thinner filtration sheet 310 allows greater filter media surface area to be packaged within a given volume, which results in an approximately corresponding increase in filter life.

As described with respect to FIG. 6A, the structural strength of the support sheet 312 is a function of the material properties of the support sheet 312 and the geometry of the corrugations (e.g., pleats, etc.). In some embodiments, the stiffness (e.g., the Gurley and/or Taber stiffness) of the support sheet 312 is greater than the stiffness of the filtration sheet 310. Additionally, the support sheet 312 is made from a material that is chemically compatible with the fluid (e.g., air, fuel, lube oil, etc.) under the operating conditions of the intended application. Notably, the support sheet 312 is impermeable (or substantially impermeable) to the fluid to be filtered or at least less permeable to the fluid to be filtered than the filtration sheet 310. In some embodiments, the support sheet 312 includes impermeable sheets of metal (e.g., aluminum), plastic, polymeric material (e.g., rubber with molded corrugations, nylon, phenolic, etc.), and/or ceramic formed into the desired shape. In other embodiments, the support sheet 312 includes restrictive, but not impermeable fibrous filter media, such as low permeability glass media bonded with polymeric resins and/or other restrictive and structural robust materials (e.g., a nonwoven fabric material, etc.). Importantly, the materials used for the support sheet 312 should be selected to ensure that the bulk of the fluid passes through the filtration sheet 310 (e.g., such that any flow rate and velocity through the support sheet 312 is significantly lower than through the filtration sheet 310). This ensures that any fluid passing through the support sheet 312 will be cleaner than fluid passing through the filtration sheet 310. Among other benefits, using a restrictive, but not impermeable material for the support sheet 312 provides similar benefits as combination full-flow/bypass filter elements and filter assemblies, but differs in that the full-flow and bypass components are integrated into the same media pack 300 and occupy the same volume of space.

FIG. 6B is a table summarizing an example range of material properties for the filtration sheet 310 and the support sheet 312. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Figure 7:
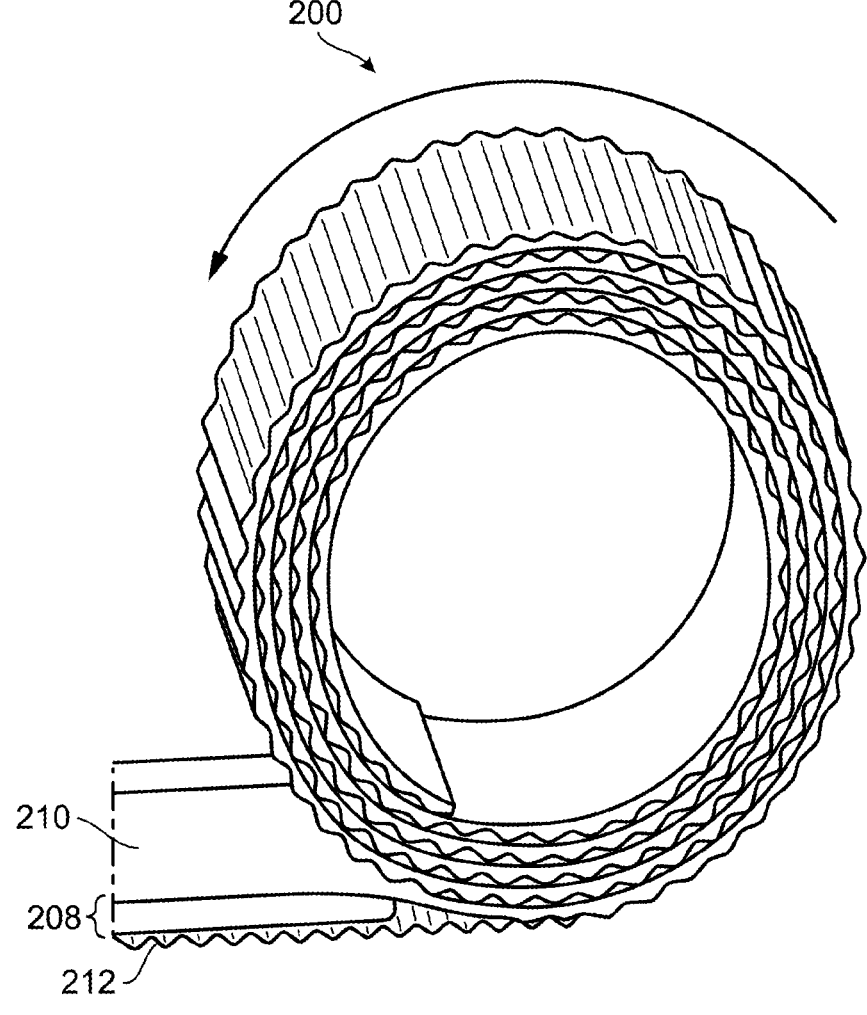
FIG. 7 is a perspective view of the media pack of FIG. 3 during a winding operation.

FIG. 7 shows a perspective view of the multilayered media pack 200 of FIG. 3 during a forming operation. The multilayered media pack 200 is formed by winding, rolling, and/or wrapping the media form 208 in a spiral around a mandrel (e.g., the center tube 106 of FIG. 1). More specifically, a method of making the media pack 200 includes providing a corrugated support sheet 212 and a filtration sheet 210. The support sheet 212 and the filtration sheet 210 may be provided as bulk material rolls cut to an approximately equal width. Alternatively, the support sheet 212 and the filtration sheet 210 may be cut during the feeding operation (e.g., before bonding the filtration sheet 210 to the support sheet 212). The method may further include pleating, bending, or otherwise forming corrugations into the support sheet 212.

As shown in FIG. 7, the method additionally includes bonding a first end of the filtration sheet 210 to the support sheet 212. For example, the method may include aligning the filtration sheet 210 with the support sheet 212 at a position above the support sheet 212, and applying adhesive (e.g., glue, hotmelt, etc.) to seal opposing ends of the support sheet 212 (e.g., along one of the upstream or downstream ends of the support sheet 212, in between corrugations, etc.). Alternatively, the adhesive may be applied to the filtration sheet 210, or to both the support sheet 212 and the filtration sheet 210. The adhesive may be applied in dots along the length of the support sheet 212 and/or the filtration sheet 212, or in a bead along the edge of the support sheet 212 and/or the filtration sheet 212. Next, the filtration sheet 210 is applied to an upper surface of the support sheet 212 above the adhesive. The method further includes applying a second bead of adhesive to the filtration sheet 210, parallel to the first bead, along an opposing edge of the filtration sheet 210 as the first bead. Together, the corrugated support sheet 212, the filtration sheet 210, and the first and second adhesive beads form a media form 208. The method additionally includes winding the media form onto itself along a feed direction parallel to the first and second adhesive beads (e.g., in a counterclockwise rotation as shown in FIG. 7). In other embodiments, the method may include additional, fewer, and/or different operations.

Figure 8:
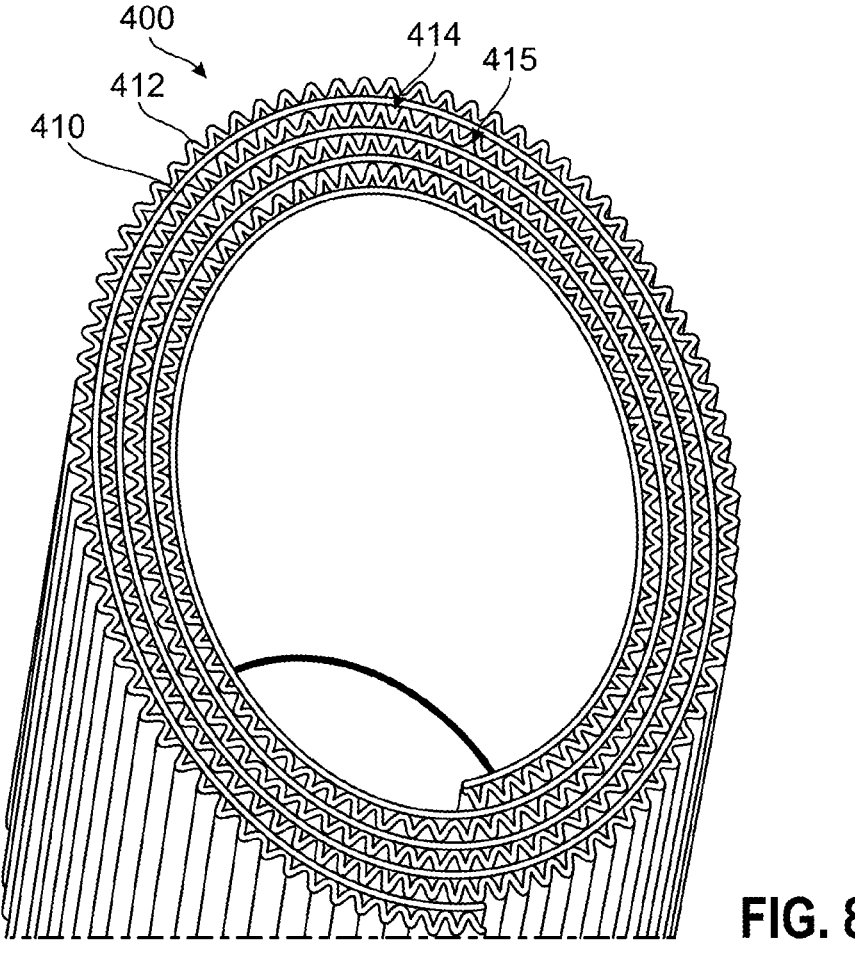
FIG. 8 is a perspective view of a media pack portion of a filter element, according to another embodiment.
Figure 9:
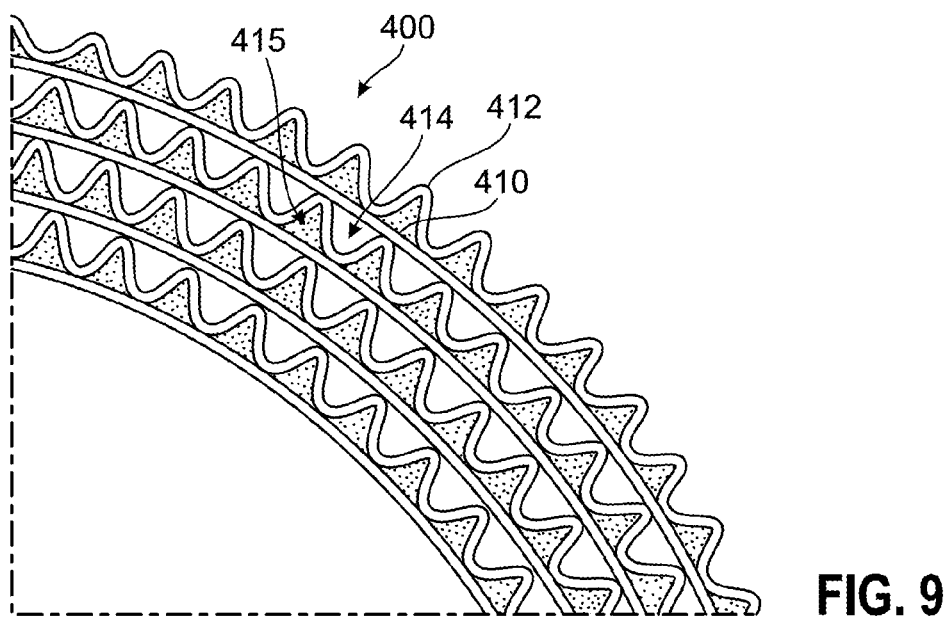
FIG. 9 is a reproduction of a portion of the media pack of FIG. 8 near an upstream end of the media pack.

The arrangement and geometry of the media packs 200, 300 described with reference to FIGS. 1-7 should not be considered limiting. Many variations are possible without departing from the inventive concepts disclosed herein. For example, FIGS. 8-9 show perspective views of a media pack 400 that includes a fluted channel geometry, similar to the media pack 300 described with reference to FIG. 6A. Again, the coiled media pack 400 is formed by alternately stacking a corrugated support sheet 412 and a substantially flat filtration sheet 410, and winding the layers into a cylindrical shape. In other embodiments, the layers may be wound in an oblong shape (e.g., an elongated rectangle/racetrack or oval), a square shape, a rectangular shape, or another suitable shape. Fluid flows into the open upstream ends of the alternately sealed channels 414, parallel to the walls of the channels 414, and through the walls of the filtration sheet 410 to an adjacent channel 415 on the clean side of the media pack 400. Fluid is discharged from openings of the adjacent channel 415 at a downstream end of the media pack 400.

Figure 10:
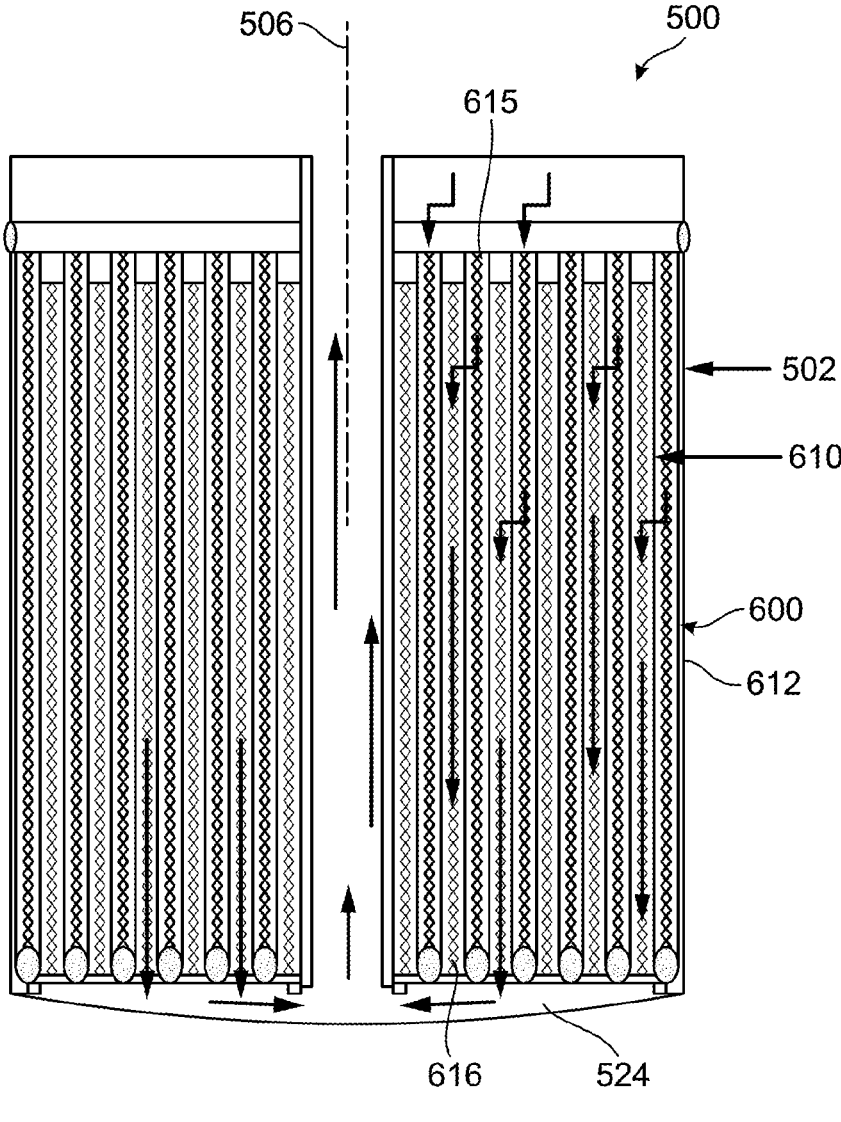
FIG. 10 is a side cross-sectional view of a filter assembly, according to another embodiment.

The flow configuration through the media pack may differ in various embodiments. For example, FIG. 10 shows a filter element 500 in which flow direction of the fluid is reversed from that shown and described with reference to the filter element 100 of FIG. 1. Dirty, contaminated fluid 20 enters the filter element 500 in an axial direction, parallel to a central axis 506 of a media pack 600. Fluid 20 is received within inlet channels 615 through openings at the upper end of the media pack 600. The fluid 20 is directed along the channels by the corrugated support sheet 612 and through the filtration sheet 610 into an adjacent outlet channel 616 on the clean side of the media pack 600. The filtration sheet 610 removes particulate/contaminates from the fluid 20 to produce a clean fluid 20. The fluid 20 is ejected (e.g., discharged) from the outlet channels 616 through openings at a lower end of the media pack 600, and into a fluid receiving region 524 between the media pack 600 and a housing 502 of the filter element 500. Clean fluid 20 is discharged from the fluid receiving region 524 through a central opening at an upper end of the housing 502.

Figure 11:
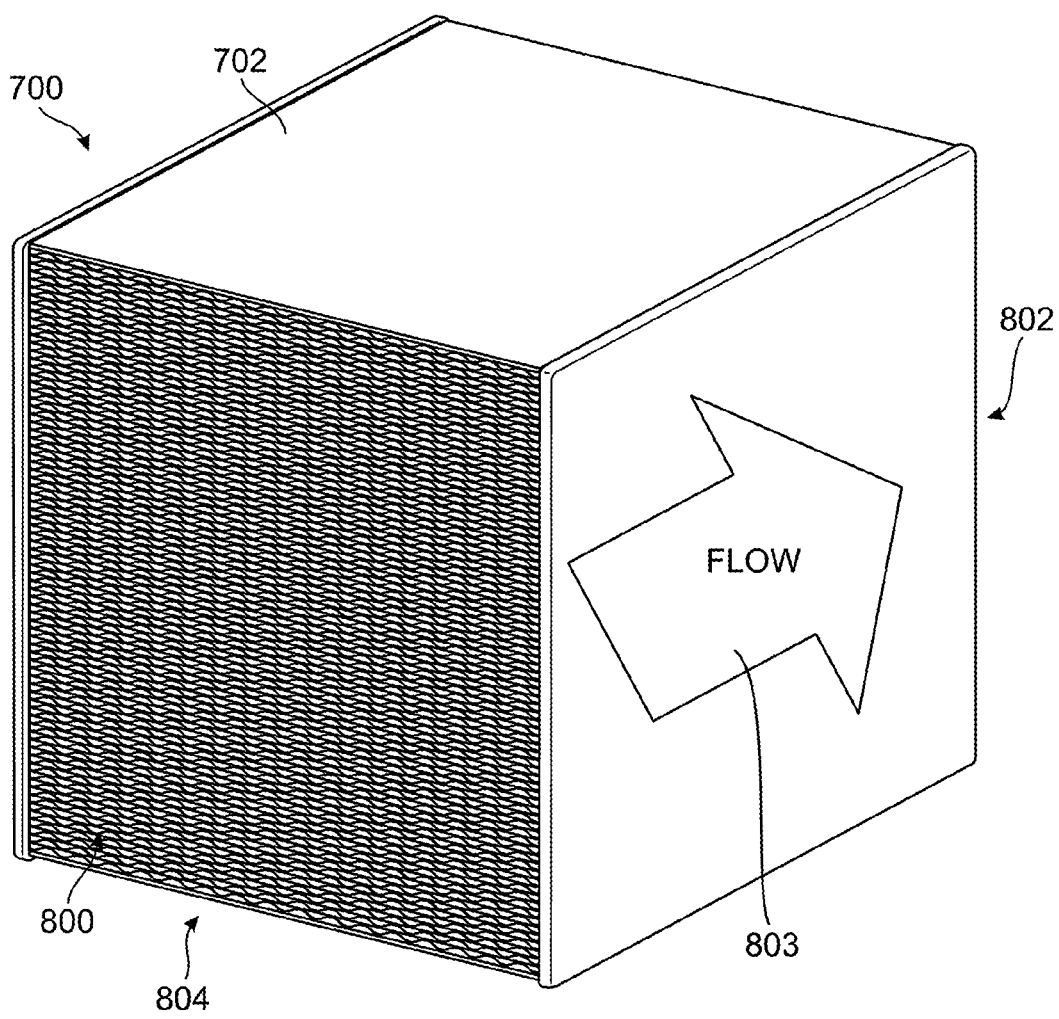
FIG. 11 is a perspective view of a filter assembly, according to another embodiment.

FIG. 11 is a perspective view of a filter element 700 having a media pack 800 arranged in a generally rectangular shape, according to an embodiment. In other embodiments, the filter media pack 800 may be formed in another suitable shape; for example, the filter media pack may be arranged in a square or other polygonal shape, a curved shape (e.g., oval, circular, elliptical), an asymmetric shape, or any other shape based on application specific requirements. The filter media pack 800 is disposed within a housing 702 or frame that substantially surrounds the filter media pack 800 on four sides of the media pack 800. The media pack 800 is sealingly engaged with the housing 702 to prevent fluid from bypassing through an interface between the housing 702 and the media pack 800. The media pack 800 may be mechanically connected to the housing 702 using an adhesive product such as glue or hotmelt. Alternatively, or in combination, the filter element 700 may include seals (e.g., gaskets, etc.) that extend along a perimeter of the housing 702 along the interface between the media pack 800 and the housing 702. In other embodiments, the housing 702 includes a polyurethane coating applied along all four sides (e.g., the non-flow faces) of the media pack 800.

As shown in FIG. 11, the media pack 800 defines an inlet surface at an upstream end 804 of the media pack 800 that is configured to receive unfiltered (e.g., dirty) fluid, and an outlet surface at a downstream end 802 of the media pack 800 that is configured to expel fluid that has been filtered (e.g., fluid that has passed through the media pack 800, along a flow direction 803 through the media pack 800). In other embodiments, the flow direction may be reversed from that shown in FIG. 11.

Figure 12:
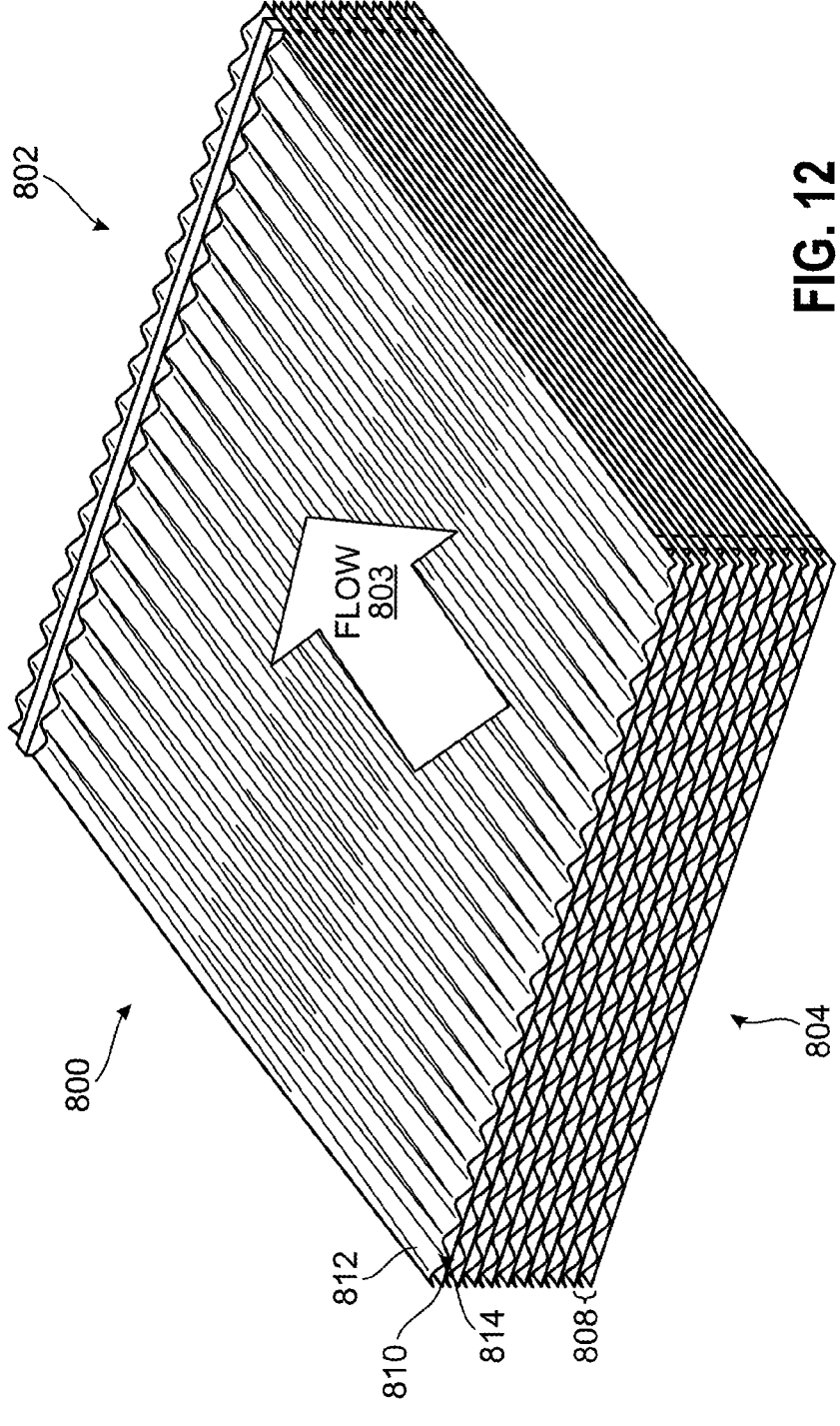
FIG. 12 is a perspective view of a portion of a media pack of the filter assembly of FIG. 11.
Figure 13:
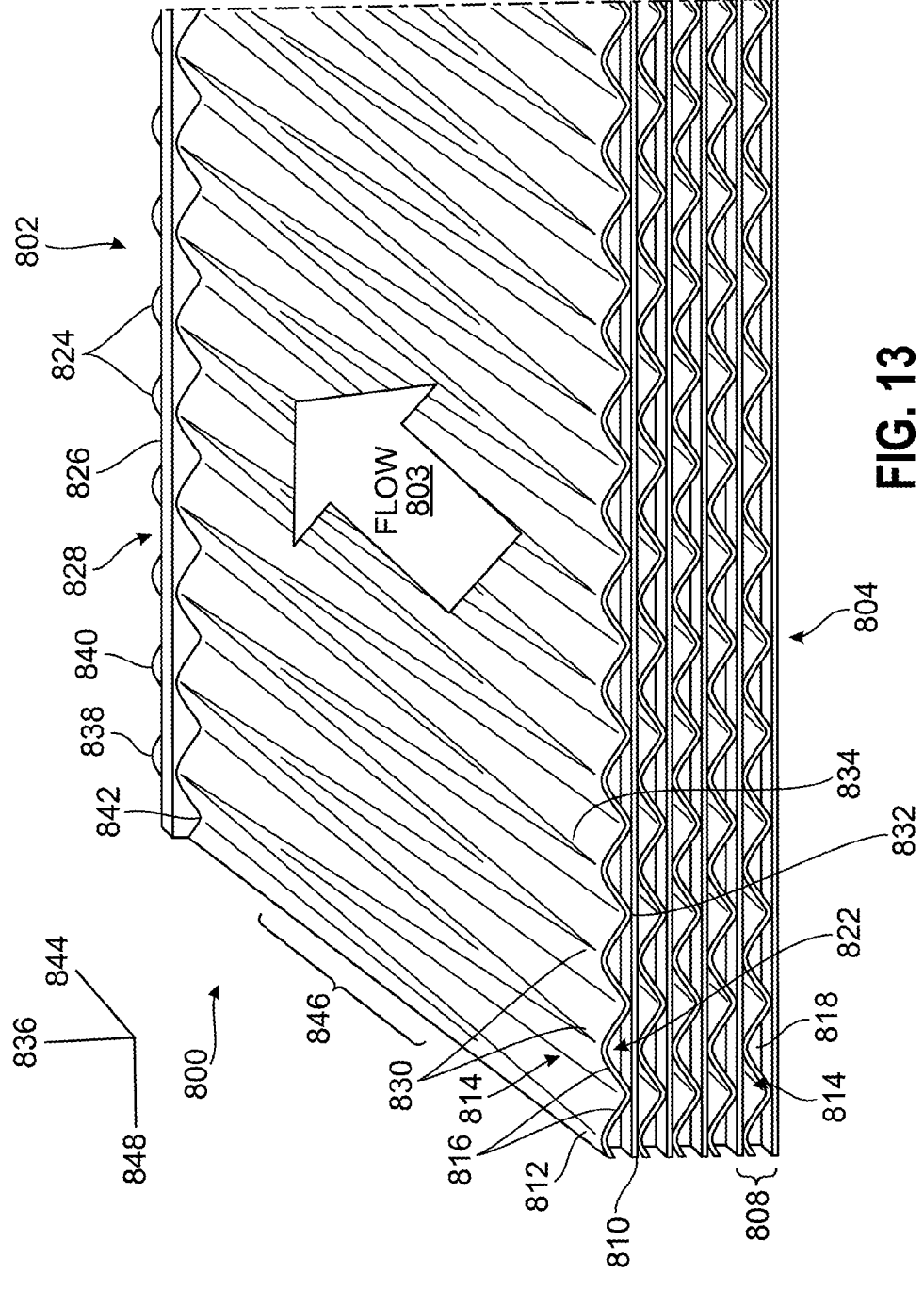
FIG. 13 is a perspective view of the media pack of FIG. 12 from an upstream end of the media pack.

FIGS. 12-13 are perspective views of a portion of the filter media pack 800 of FIG. 11. As shown is FIGS. 12-13, the media pack 800 is a multilayered filter media that includes a plurality of support sheets 812 and a plurality of filtration sheets 810 that are stacked or otherwise arranged on top of one another in alternating sequence. More specifically, the media pack 800 is formed by stacking a plurality of media forms 808 that are each cut to a desired length and width before assembly (e.g., before stacking and placement into the housing 702). As with other embodiments described herein, flow channels 814 are formed by the intersection between the filtration sheet 810 and the support sheet 812. The channels 814 are alternately sealed at each end of the media pack 800 such that an open channel 814 at an upstream end 804 of the media pack 800 is closed at the downstream end 802 of the media pack 800.

As shown in FIG. 13, the support sheet 812 includes material that is defined by a plurality of interdigitated tetrahedral forms extending from the upstream and downstream ends of the media pack 800. The structure of the tetrahedral forms may be similar to that shown in FIG. 13 is described in detail in International Patent Publication No. PCT/US2019/039876, filed Jun. 28, 2019, and U.S. Pat. No. 8,397,920, filed Oct. 14, 2011, the entire disclosures of which are hereby incorporated by reference herein.

As shown in FIG. 13, the support sheet 812 includes a plurality of axially extending wall segments (e.g., extending in an axial direction 844) that extend in a serpentine manner between a plurality of axially extending bend lines. The wall segments include a first set of wall segments 816 alternately sealed to each other at the upstream end 804, e.g. by adhesive 818 or the like, to define a first set of channels 814 having open upstream ends, and a second set of channels 822 interdigitated with the first set of channels 814 and having closed upstream ends. The wall segments also include a second set of wall segments 824 alternately sealed to each other at the downstream end 802, e.g., by adhesive 826 or the like, to define a third set of channels (not shown—similar in geometry to the second set of channels 822) having closed upstream ends, and a fourth set of channels 828 interdigitated with the third set of channels and having open upstream ends. A first set of bend lines 830 includes a first subset of bend lines 832 defining the first set of channels 814, and a second subset of bend lines 834 defining the second set of channels 822. The second subset of bend lines 834 taper in transverse direction 836 (perpendicular to the axial direction 844) as they extend from the upstream end 804 axially towards the downstream end 802. A second set of bend lines 838 includes a third subset of bend lines 840 defining the third set of channels, and a fourth subset of bend lines 842 defining the fourth set of channels 828. The third subset of bend lines 840 taper in the transverse direction 836 as they extend from the upstream end 804 axially towards the downstream end 802. The second set of channels 822 have a decreasing transverse channel height along transverse direction 836 as the second set of channels 822 extend axially along axial direction 844 towards the downstream end 802. The tapering of the second subset of bend lines 834 in the transverse direction 836 provides the decreasing transverse channel height of the second set of channels 822. The third set of channels have a decreasing transverse channel height along transverse direction 836 as the third set of channels extend axially along axial direction 844 towards the upstream end 804. The tapering of the third subset of bend lines 840 in the transverse direction 836 provides the decreasing transverse channel height of the third set of channels.

Incoming dirty fluid to be filtered flows along axial direction 844 into open channels 814 at the upstream end 804 and passes transversely through the filtration sheets 810 and then flows axially along axial direction 844 as clean filtered fluid through open channels (e.g., the third set of channels) at the downstream end 802. In some embodiments, the flow is reversed through the media pack 800 such that incoming dirty fluid to be filtered flows along axial direction 844 into open channels (e.g., the third set of channels) and passes transversely through the filtration sheets 810 and then flows axially along axial direction 844 as clean filtered fluid through open channels 814.

The second subset of bend lines 834 taper to respective termination points, providing at such termination points the minimum transverse channel height of the second set of channels 814. The third subset of bend lines 840 taper to respective termination points providing at such termination points the minimum transverse channel height of the third set of channels 60. Termination points of the second subset of bend lines 834 are axially downstream of termination points of third subset of bend lines 840. This provides the noted axially overlapping sections 846.

The first set of wall segments 816 are alternately sealed to each other at adhesive 818 at the upstream end 804 define a first set of tetrahedron forms 814 having open upstream ends, and a second set of tetrahedron forms 822 interdigitated with the first set of tetrahedron forms 814 and having closed upstream ends. The second set of wall segments 824 are alternately sealed to each other at adhesive 826 at the downstream end 802 to define a third set of tetrahedron forms having closed upstream inlets, and a fourth set of tetrahedron forms 828 interdigitated with the third set of tetrahedron forms and having open upstream inlets.

The first set of tetrahedron forms 814 and the second set of tetrahedron forms 822 face oppositely to the third set of tetrahedron forms and the fourth set of tetrahedron forms 828. Each of the tetrahedron forms is elongated in the axial direction 844. Each of the tetrahedron forms has a cross-sectional area along a cross-sectional plane defined by the transverse direction 836 (perpendicular to the axial direction 844) and the lateral direction 848 (perpendicular to both the axial direction 844 and the transverse direction 836). The cross-sectional areas of the first set of tetrahedron forms 814 and the second set of tetrahedron forms 822 decrease as the first set of tetrahedron forms 814 and the second set of tetrahedron forms 822 extend along axial direction 844 from the upstream end 804 toward the downstream end 802. The cross-sectional areas of third set of tetrahedron forms and the fourth set of tetrahedron forms 828 decrease as the third set of tetrahedron forms and the fourth set of tetrahedron forms 828 extend along axial direction 28 from the upstream inlet 24 toward the downstream outlet. The bend lines in the support sheet 812 may be bent at a sharp pointed angle or rounded along a given radius, as shown in FIG. 13. In other embodiments, another suitable corrugation geometry may be formed into the support sheet 812.

FIG. 14 shows a table of test results for axial flow filter elements (tests A and C) and normal flow filter elements (tests B and D) under different test conditions. For example, Tests A and B compare two different filter types with identical filter media volume. Test A shows the normalized dust holding capacity (e.g., the mass of dust held by the filter divided by the volume of the filter, in units of kg per cubic meter) of an axial flow filter element according to the present disclosure, while Test B shows the normalized capacity of a normal flow filter element. FIG. 15 shows the percent change in dust holding capacity between Tests A and B. As shown, the axial flow filter element demonstrates a 48% greater contaminant holding capacity than a normal flow filter element occupying the same volume.

Tests C and D compare the performance of an axial flow filter element according to the present disclosure with a normal flow filter element at the same face velocity. By comparing Tests A and C, or Tests B and D in FIG. 15, it is shown that increasing the face velocity reduces the overall dust holding capacity of both filter elements. The change in performance between the two types of filter elements when tested under identical face velocity conditions is shown in the last row of FIG. 15 (comparing Tests C and D). As shown, the axial flow filter element demonstrates approximately 21% greater contaminant holding capacity under this condition. This result shows that the performance improvement associated with the axial flow filter element geometry disclosed herein is not simply due to packing more media into the same volume (and the resulting reduction in face velocity).

III. Example Multi-Stage Filter Element

Figure 16:
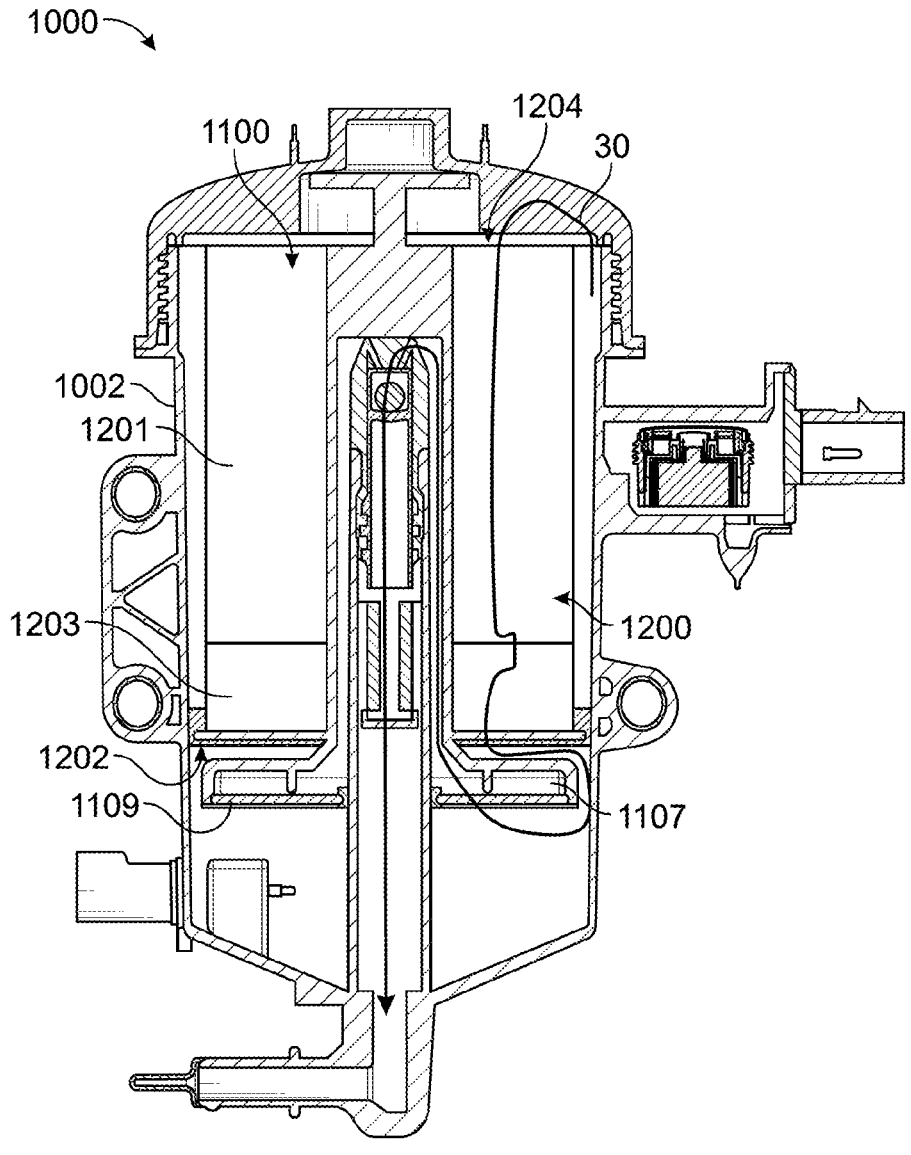
FIG. 16 is a side cross-sectional view of a filter assembly, according to another embodiment.
Figure 17:
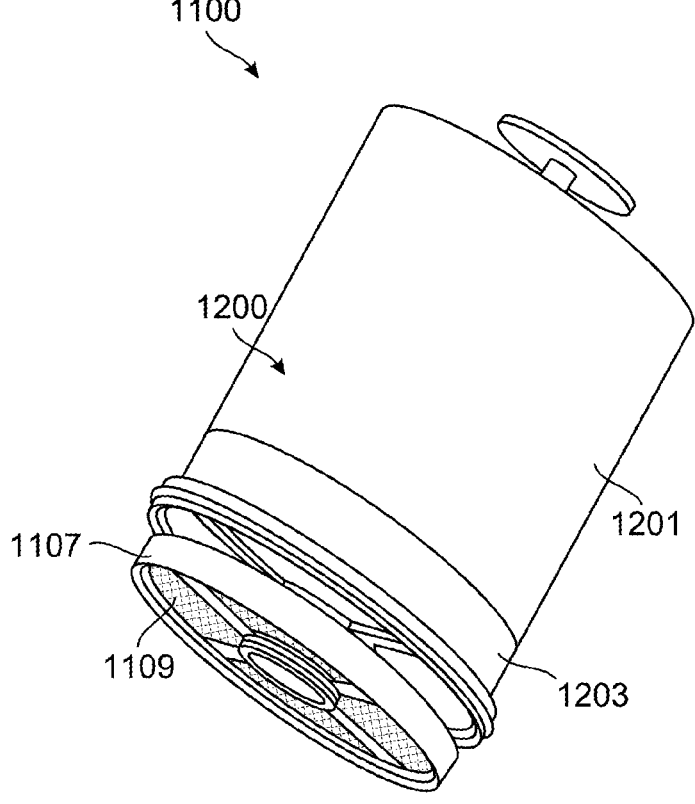
FIG. 17 is a perspective view of a filter element of the filter assembly of FIG. 16.

FIG. 16 is a side cross-sectional view of a filter assembly 1000 that includes a multiple stage filter element 1100, according to an embodiment. In some implementations, the filter element 1100 is a replaceable coalescer element for a fuel-water separator system. As shown in FIG. 16, the filter element 1100 is disposed within a housing 1002 of the filter assembly 1000. A lower end of the filter element 1100 is sealingly engaged with the housing 1002 along a perimeter of the filter element 1100 to prevent fluid bypass between a clean and dirty side of the filter element 1100. As shown in FIG. 17, the filter element 1100 does not include its own housing; rather, the media pack 1200 is exposed to an environment surrounding the filter element 1100. The media pack 1200 includes a first filtration stage 1201 and a second filtration stage 1203 having a different permeability than the first filtration stage 1201 for the fluid to be filtered. More specifically, the filtration sheet of the first filtration stage 1201 has a different permeability than the filtration sheet of the second filtration stage 1203. The first filtration stage 1201 is disposed upstream of the second filtration stage 1203 along a flow direction through the media pack 1200 (e.g., parallel to a central axis of the media pack 1200, etc.). In other embodiments, the first filtration stage 1201 and the second filtration stage 1203 may have the same permeability. In other words, the second filtration stage 1203 could be used as a refinement of the first filtration stage 1201 to increase the overall particulate removal efficiency of the filter element. In such an embodiment, the media used in the second filtration stage 1203 could be the same as the media used in the first filtration stage 1201.

Figure 18:
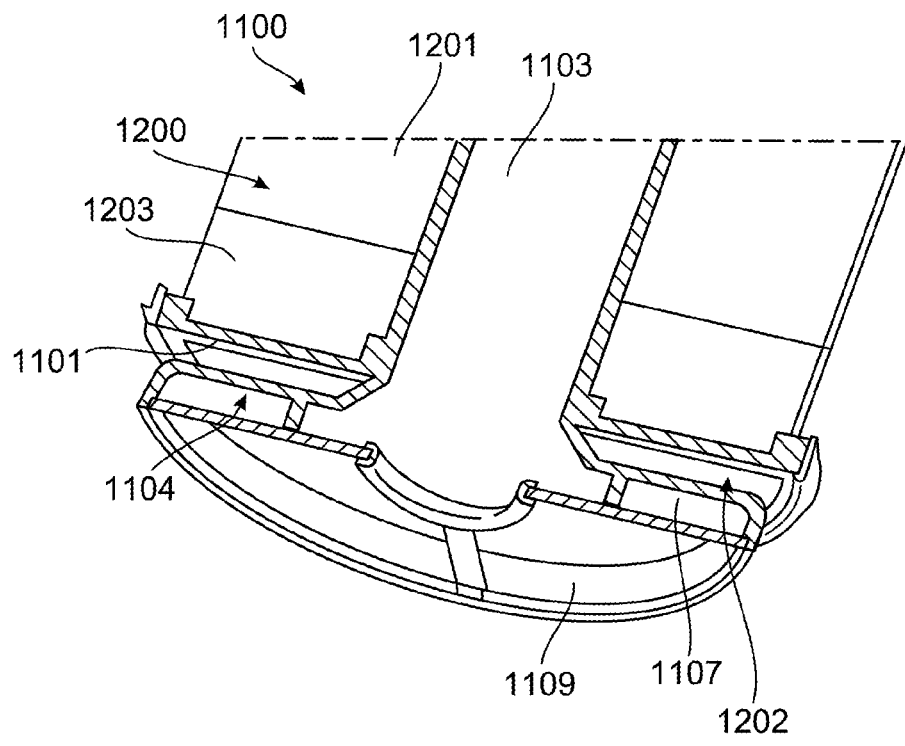
FIG. 18 is a perspective cross-sectional view of the filter element of FIG. 17.

FIG. 18 is a side cross-sectional view of the filter element 1100, near the downstream end 1202 of the media pack 1200. The filter element 1100 includes an endcap 1104 coupled to the downstream end 1202. The endcap 1104 includes an upper portion or skirt 1101, a hollow center tube 1103 extending upwardly from the skirt 1101 in substantially perpendicular orientation relative to the skirt 1101, and a lower portion or flange 1107 spaced apart from a lower surface of the skirt 1101. The endcap 1104 further includes a hydrophobic filter 1109 (e.g., screen, etc.) coupled to the flange 1107 and covering an entrance to the hollow center tube 1103. As shown in FIG. 18, the downstream end 1202 of the media pack 1200 is coupled to the skirt 1101.

In some embodiments, the media pack 1200 is potted into the endcap 1104 by heating the skirt 1101 (e.g., with a flame or other heat source) and embedding the media pack 1200 into the partially melted skirt 1101. Among other benefits, embedding the media pack 1200 into a heated skirt 1101 reduces quality concerns (e.g., blocked channels in the media pack 1200) associated with using an adhesive product such as glue or hotmelt, which may overflow onto one or more openings on the discharge end of the media pack 1200 during potting.

Figure 19:
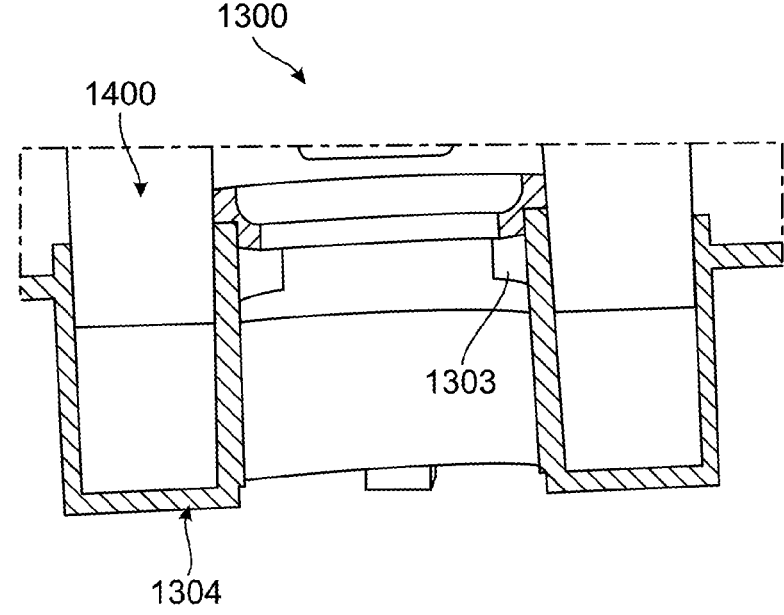
FIG. 19 is a cross-sectional view of a filter element, according to another embodiment.

The design of the endcap 1104 described with reference to FIG. 18 should not be considered limiting. For example, in some implementations, the center tube 1103 may be formed separately from the endcap 1104 and embedded into the media pack 1200 independently from the endcap 1104. FIG. 19 is a side cross-sectional view of a filter element 1300 according to another embodiment. Again, the filter element 1300 includes an endcap 1304 and a hollow center tube 1303. However, unlike the endcap 1104 shown in FIG. 18, the center tube 1303 of the endcap 1304 of FIG. 19 extends only partially into a hollow interior region formed by the media pack 1400.

Referring again to the filter assembly 1000 of FIGS. 16-18, the fluid 30 flow path through the filter assembly 1000 is indicated by the solid arrow in FIG. 16. Dirty fluid 30 is received within an annular space between the filter element 1100 and an inner surface of the housing 1002. Fluid enters the filter element 1100 through an upper surface of the filter element 1100, at an upstream end 1204 of the media pack 1200. From the upstream end 1204, fluid 30 is directed vertically downwardly (as shown in FIG. 16), through one of a plurality of channels formed by the first filtration stage 1201 of the media pack 1200. The fluid 30 is directed by the first filtration stage 1201 into the second filtration stage 1203. After flowing through the second filtration stage 1203, the fluid 30 is ejected (e.g., discharged) through a downstream end 1202 of the media pack 1200. The fluid 30 is then redirected around the flange 1107 and up through the hydrophobic filter 1109 toward a discharge opening of the housing 1002.

Figure 20:
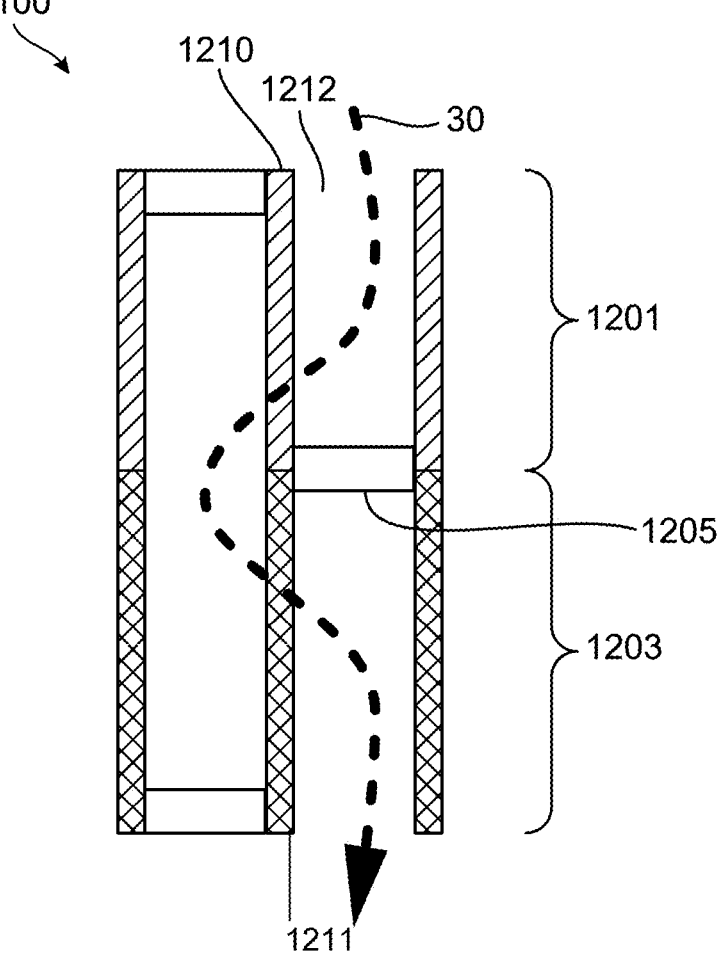
FIG. 20 is a cross-sectional view of a portion of the filter element of FIG. 17 between a first filtration stage and a second filtration stage.

FIG.20 is a side cross-sectional view of the filter element 1100 of FIGS. 16-18, near an intersection between the first filtration stage 1201 and the second filtration stage 1203. In some embodiments, the second filtration stage 1203 is formed separately from the first filtration stage 1201, as a separate media pack that is bonded to a downstream end the first filtration stage 1201. In other embodiments (as shown in FIG. 20), the first filtration stage 1201 is integrally formed with the second filtration stage 1203 as a single unitary body. The first filtration stage 1201 and the second filtration stage 1203 each include a corrugated support sheet 1212, which is continuous across the first filtration stage 1201 and the second filtration stage 1203. In other words, a single corrugated support sheet 1212 is shared between the first filtration stage 1201 and the second filtration stage 1203.

In some embodiments, a portion of a multi-layer filtration sheet 1210 is also shared between the first filtration stage 1201 and the second filtration stage 1203. For example, the second filtration stage 1203 may include only a single layer 1211 (e.g., a backing layer, etc.) of the filtration sheet 1210, while the first filtration stage 1201 includes all of the layers (e.g., the backing layer and filtration layers, etc.). As such, the second filtration stage 1203 may have a higher permeability than the first filtration stage 1201 for the fluid to be filtered. Among other benefits, the inverted staging (fine to coarse) between the first filtration stage 1201 and the second filtration stage 1203 may improve coalescing performance. In implementations where the backing layer is too open to serve as a coalescing layer, an appropriate melt blown layer may be added to the filtration sheet 1210 to serve as the functional coalescing media in the second filtration stage 1203. Alternatively, or in combination, different portions of the filtration sheet 1210 may be formed with different material layers (e.g., additional melt blown layers, etc.) to further tailor the performance of the filter element 1100. In some embodiments, the filtration sheet 1210 in the second filtration stage 1203 may include a hydrophobic screen sealed to a backing sheet (e.g., via an ultrasonic welding operation proximate to the upper and lower glue joints). Perforations may be added near the bottom of the hydrophobic screen to drain any water collected by the screen from the second filtration stage 1203.

As shown in FIG. 20, the first filtration stage 1201 is at least partially separated from the second filtration stage 1203 by an adhesive barrier 1205 (e.g., glue or hotmelt). The adhesive barrier 1205 prevents any unfiltered fluid 30 from bypassing the first filtration stage 1201. As shown in FIG. 20, the adhesive barrier 1205 forces the fluid 30 through the filtration sheet 1210 (e.g., a flat filtration sheet) in the first filtration stage 1201 and into an adjacent channel of the first filtration stage 1201 that is fluidly couple to the upstream end of a corresponding channel of the second filtration stage 1203.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

What is claimed is:

1. A media pack, comprising:
a filtration sheet; and
a corrugated support sheet coupled to the filtration sheet, the corrugated support sheet made from a different material than the filtration sheet, the corrugated support sheet and the filtration sheet forming a plurality of channels that are alternately sealed on opposing ends of the media pack, a permeability of the corrugated support sheet being less than a permeability of the filtration sheet so that a bulk of a liquid to be filtered passes through the filtration sheet.

2. The media pack of claim 1, wherein the filtration sheet and the corrugated support sheet are stacked on top of one another in an alternating fashion along a radial direction, the plurality of channels being axial flow channels that are arranged in a substantially parallel orientation relative to a central axis of the media pack.

3. The media pack of claim 1, wherein the filtration sheet does not include corrugations.

4. The media pack of claim 1, wherein the filtration sheet comprises a nanofiber material.

5. The media pack of claim 1, wherein the media pack comprises a first filtration stage and a second filtration stage, the second filtration stage having a different permeability than the first filtration stage for a fluid to be filtered.

6. The media pack of claim 5, wherein the corrugated support sheet is shared between the first filtration stage and the second filtration stage.

7. The media pack of claim 5, wherein the filtration sheet is a multi-layered sheet, and wherein at least one layer of the multi-layered sheet is shared between the first filtration stage and the second filtration stage.

8. The media pack of claim 1, wherein the corrugated support sheet comprises an upstream end and a downstream end and is pleated along a plurality of bend lines, the plurality of bend lines extending axially along an axial direction and comprising a first set of bend lines extending from the upstream end axially towards the downstream end, and a second set of bend lines extending from the downstream end axially towards the upstream end, the corrugated support sheet having a plurality of wall segments extending in a serpentine manner between the bend lines, the wall segments extending axially and defining axial channels therebetween that form the plurality of channels, the axial channels having a height along a transverse direction, the transverse direction being perpendicular to the axial direction, at least one of the bend lines tapering in the transverse direction as the at least one of the bend lines extends in the axial direction.

9. A filter element, comprising:
a center tube;
a media pack disposed around the center tube, the media pack comprising:
a filtration sheet; and
a corrugated support sheet coupled to the filtration sheet, the corrugated support sheet made from a different material than the filtration sheet, the corrugated support sheet and the filtration sheet forming a plurality of channels that are alternately sealed on opposing ends of the media pack, a permeability of the corrugated support sheet being less than a permeability of the filtration sheet for a fluid to be filtered so that a bulk of the fluid passes through the filtration sheet; and
a first endcap coupled to a first axial end of the media pack.

10. The filter element of claim 9, wherein the first endcap defines a recessed area, the first axial end of the media pack extending partially into the recessed area and spaced axially apart from an interior surface of the first endcap.

11. The filter element of claim 9, wherein the first endcap extends around and is sealingly engaged to an outer perimeter of the media pack.

12. The filter element of claim 9, wherein the filtration sheet and the corrugated support sheet are spiral wound around the center tube.

13. The filter element of claim 9, wherein the filtration sheet and the corrugated support sheet are stacked on top of one another in an alternating fashion along a radial direction, the plurality of channels being axial flow channels that are arranged in a substantially parallel orientation relative to a central axis of the media pack.

14. The filter element of claim 9, wherein the media pack comprises a first filtration stage and a second filtration stage, the second filtration stage having a different permeability than the first filtration stage for a fluid to be filtered.

15. The filter element of claim 9, further comprising:
a second endcap disposed on a second axial end of the media pack, the second endcap comprising:
an upper portion coupled to the second axial end; and
a lower portion spaced axially apart from the upper portion; and
a hydrophobic filter coupled to the lower portion.

16. The filter element of claim 9, wherein the corrugated support sheet comprises an upstream end and a downstream end and is pleated along a plurality of bend lines, the plurality of bend lines extending axially along an axial direction and comprising a first set of bend lines extending from the upstream end axially towards the downstream end, and a second set of bend lines extending from the downstream end axially towards the upstream end, the corrugated support sheet having a plurality of wall segments extending in a serpentine manner between the bend lines, the wall segments extending axially and defining axial channels therebetween that form the plurality of channels, the axial channels having a height along a transverse direction, the transverse direction being perpendicular to the axial direction, at least one of the bend lines tapering in the transverse direction as the at least one of the bend lines extends in the axial direction.

17. A filter element, comprising:
a center tube;
a media pack disposed around the center tube, the media pack comprising:
a filtration sheet; and
a corrugated support sheet coupled to the filtration sheet, the corrugated support sheet and the filtration sheet forming a plurality of channels that are alternately sealed on opposing ends of the media pack, the media pack comprising a first filtration stage and a second filtration stage, the second filtration stage having a different permeability than the first filtration stage for a fluid to be filtered, at least one layer of the corrugated support sheet or the filtration sheet being shared between the first filtration stage and the second filtration stage; and an endcap coupled to an axial end of the media pack.

18. The filter element of claim 17, wherein the corrugated support sheet is shared between the first filtration stage and the second filtration stage.

19. The filter element of claim 17, wherein the filtration sheet is a multi-layered sheet, and wherein at least one layer of the multi-layered sheet is shared between the first filtration stage and the second filtration stage.

20. The filter element of claim 17, wherein at least one layer of the corrugated support sheet and the filtration sheet is continuous across the first filtration stage and the second filtration stage, wherein the first filtration stage is disposed upstream of the second filtration stage along a flow direction through the media pack, and the filtration sheet of the first filtration stage has a different permeability than the filtration sheet of the second filtration stage.

* * * * *